(12) United States Patent
Donahue

(10) Patent No.: US 9,878,282 B2
(45) Date of Patent: Jan. 30, 2018

(54) PARTIAL GAS SEPARATION TECHNIQUE FOR OXYGEN AND NITROGEN ENRICHMENT OF ATMOSPHERIC AIR

(71) Applicant: Leonard Lawrence Donahue, Stratford, CT (US)

(72) Inventor: Leonard Lawrence Donahue, Stratford, CT (US)

( * ) Notice: Subject to any disclaimer, the term of this patent is extended or adjusted under 35 U.S.C. 154(b) by 0 days.

(21) Appl. No.: 15/431,579

(22) Filed: Feb. 13, 2017

(65) Prior Publication Data

US 2017/0232381 A1     Aug. 17, 2017

Related U.S. Application Data

(60) Provisional application No. 62/295,640, filed on Feb. 16, 2016.

(51) Int. Cl.
*B01D 53/00* (2006.01)
*B01D 53/24* (2006.01)
(Continued)

(52) U.S. Cl.
CPC ............ *B01D 53/24* (2013.01); *B01D 53/22* (2013.01); *B01D 53/30* (2013.01); *F01P 1/06* (2013.01);
(Continued)

(58) Field of Classification Search
CPC ........ B01D 53/24; B01D 53/30; B01D 53/22; B01D 2257/404; F02M 33/00; F02M 25/12; F01P 1/06; Y02T 10/121; F02B 1/04
See application file for complete search history.

(56) References Cited

U.S. PATENT DOCUMENTS

| 1,339,211 A | 5/1920 | McKernan |
| 3,817,232 A | 6/1974 | Nakajima et al. |

(Continued)

FOREIGN PATENT DOCUMENTS

| EP | 1716324 B1 | 5/2013 |
| EP | 2954943 A1 | 12/2015 |
| EP | 2853306 B1 | 3/2016 |

OTHER PUBLICATIONS

V. Balepin et al, "Progress in Air Separation with the Vortex Tubes", AIAA-99-4844, 1999 (9th International Space Planes and Hypersonic Systems and Technologies Conference, Norfolk, VA).
(Continued)

*Primary Examiner* — Dung H Bui
(74) *Attorney, Agent, or Firm* — Anatoly Frenkel

(57) ABSTRACT

The specification and drawings present a new apparatus and method for a partial gas separation technique which can be used, e.g., for continuously providing, using a predefined atmospheric air (normally atmospheric air comprises 78% of nitrogen $N_2$ and 21% of oxygen $O_2$), oxygen-enriched gas/air and/or nitrogen-enriched gas/air in fossil-fueled combustion devices/systems to a combustion area/chamber and the like for improving combustion, exhaust and related properties of the apparatus. The partial gas separation technique can be based on forming a predefined directional pattern of a gas mixture of a plurality of gases, using a direction forming element, subsequently moving an output gas from the direction forming element at least along/against one surface of a gas separation element to spatially separate in part the plurality of gases having different molecular weights.

23 Claims, 12 Drawing Sheets

(51) Int. Cl.
  *B01D 53/30* (2006.01)
  *F01P 1/06* (2006.01)
  *F02M 33/00* (2006.01)
  *B01D 53/22* (2006.01)
  *F02B 1/04* (2006.01)
  *F02M 25/12* (2006.01)

(52) U.S. Cl.
  CPC ............... *F02M 33/00* (2013.01); *F02B 1/04* (2013.01); *F02M 25/12* (2013.01); *Y02T 10/121* (2013.01)

(56) References Cited

U.S. PATENT DOCUMENTS

| | | | |
|---|---|---|---|
| 3,876,396 A * | 4/1975 | Arnold | B01D 45/08 |
| | | | 261/118 |
| 4,351,302 A | 9/1982 | Brettler | |
| 5,051,011 A | 9/1991 | Satoh et al. | |
| 5,051,114 A | 9/1991 | Nemser et al. | |
| 5,400,746 A | 3/1995 | Susa | |
| 5,526,641 A | 6/1996 | Sekar et al. | |
| 5,553,591 A | 9/1996 | Yi | |
| 5,640,845 A | 1/1997 | Ng et al. | |
| 5,636,619 A | 6/1997 | Poola et al. | |
| 5,649,517 A | 7/1997 | Poola et al. | |
| 5,678,526 A | 10/1997 | Cullen | |
| 5,779,770 A | 7/1998 | ShoichiroNitta | |
| 6,543,428 B1 | 4/2003 | Biandino et al. | |
| 8,216,331 B2 * | 7/2012 | Muller | B01D 46/08 |
| | | | 55/434 |
| 9,254,493 B2 | 2/2016 | Inoue et al. | |
| 9,375,546 B2 | 6/2016 | Ruff | |
| 2003/0015185 A1 | 1/2003 | Dutart | |
| 2003/0150324 A1 * | 8/2003 | West | B01D 17/0211 |
| | | | 95/268 |
| 2009/0078118 A1 * | 3/2009 | Kooijman | B01D 1/305 |
| | | | 96/207 |
| 2011/0120592 A1 * | 5/2011 | Gabler | B01D 3/008 |
| | | | 141/285 |
| 2015/0337697 A1 * | 11/2015 | Kira | F01M 13/04 |
| | | | 123/41.86 |
| 2017/0021302 A1 | 1/2017 | Galabraith et al. | |

OTHER PUBLICATIONS

Jun Cai et al, Oxygen enrichment from Air using the Interception Effect of Gradient Magnetic Field on Oxygen Molecules:, Physics Letters A 362, pp. 105-108, 2007.

A. R. Smith and J. Klosek, "A review of Air Separation and their Integration with Energy Conversion Processes", Fuel Processing Technology 70, pp. 115-134, 2001.

* cited by examiner

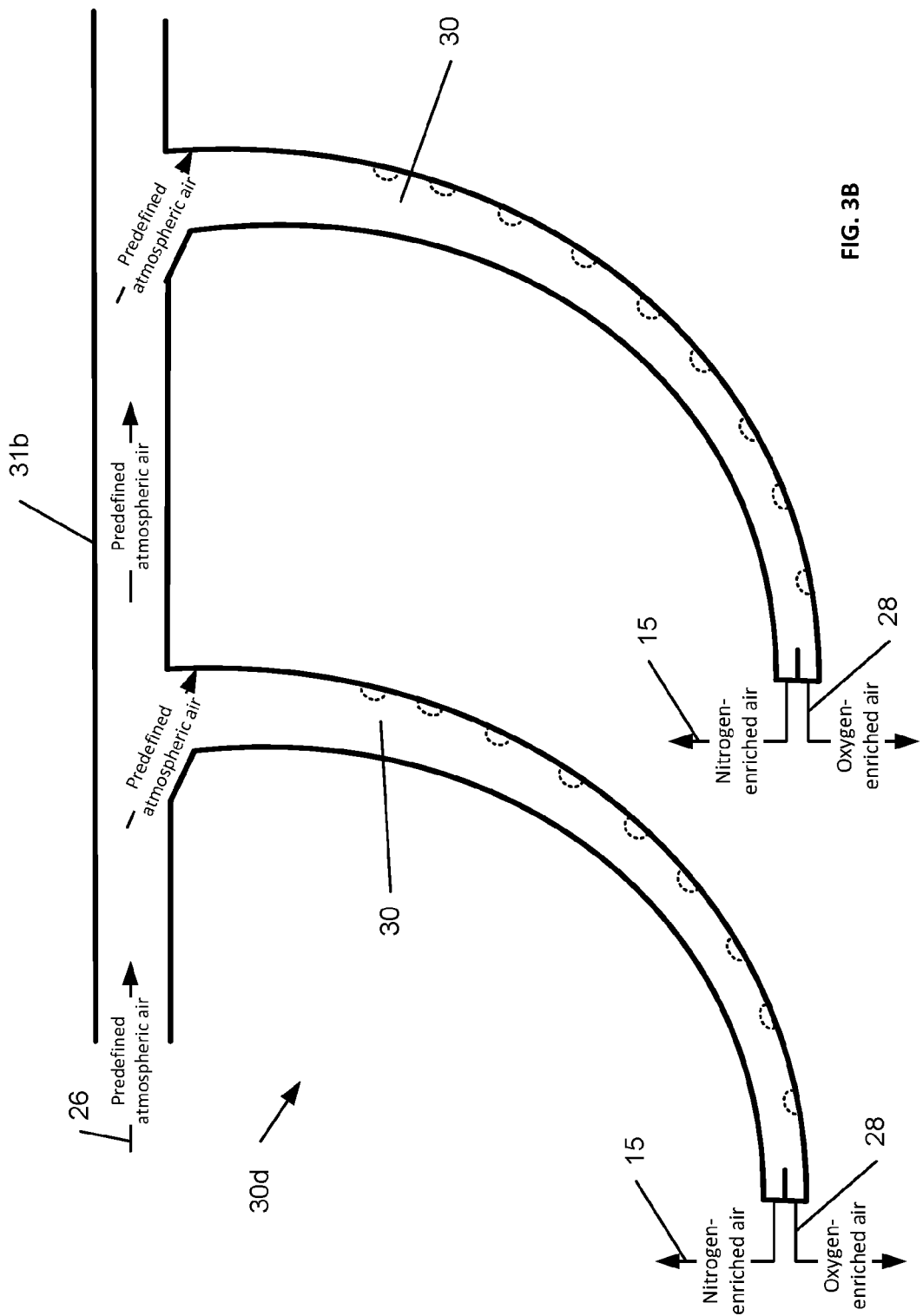

PARTIAL GAS SEPARATION TECHNIQUE FOR OXYGEN AND NITROGEN ENRICHMENT OF ATMOSPHERIC AIR

CROSS-REFERENCE TO RELATED APPLICATIONS

This non-provisional U.S. patent application claims the benefit of the filing date under 35 USC 119(e) of U.S. provisional patent application No. 62/295,640 filed on Feb. 16, 2016, the teachings of which are incorporated herein by reference in their entirety.

TECHNICAL FIELD

The invention generally relates to gas separation and fossil-fueled combustion devices/systems. More particularly but not exclusively, this invention relates to a partial gas separation technique which can be used for continuously providing, using a predefined atmospheric air, oxygen-enriched gas/air as well as nitrogen-enriched gas/air in fossil-fueled combustion devices/systems for improving combustion, exhaust and related properties.

BACKGROUND OF THE INVENTION

It was recognized for many decades that using oxygen-enriched air in fossil-fueled combustion engines can lead to significant benefits, such as increasing in power output, improving fuel consumption (conversion efficiency) and thermal conversion efficiency, and reducing exhaust emissions of carbon monoxide and hydrocarbons. It was further demonstrated that introducing nitrogen-enriched air in the combustion process and/or exhaust circulation system can be useful for decreasing particulates, such as hydrocarbons, and gases like CO and $NO_X$, in exhaust emissions of internal combustion engines.

Substantial efforts have been aimed at improving engine efficiencies and decreasing emissions that pollute the environment, using, for example, permeable membranes, to provide the oxygen-enriched and/or nitrogen-enriched air. Notwithstanding the advantages of introducing the oxygen-enriched air and/or nitrogen-enriched air in various fossil-fueled combustion devices/systems, the lack of an economical source of on-line oxygen and nitrogen has made it difficult to provide a practical application of the concept of providing the oxygen-enriched air and/or nitrogen-enriched air to corresponding engines/systems, at least during various phases or time periods of operation of the engine.

SUMMARY OF THE INVENTION

According to a first aspect of the invention, an apparatus, comprising at least one gas/air separator which comprises: an input port for entering a gas mixture of a plurality of gases having different molecular weights; a direction forming element, configured to intake the gas mixture to form a predefined directional pattern of the gas mixture; a gas separation element having at least one surface, so that an output gas from the direction forming element is provided at least along the at least one surface to spatially separate in part the plurality of gases, where gases with a larger molecular weight out of the different molecular weights are concentrated closer to the at least one surface; at least one collector gate, configured to collect a first gas mixture enriched with a first gas (a first enriched gas) near the at least one surface, the first gas having a largest molecular weight of the different molecular weights; and at least one further collector gate placed in a vicinity of the first collector gate but located further away from the at least one surface than the first collector, and configured to collect a second gas mixture enriched with a second gas (a second enriched gas), the second gas having a smaller molecular weight than the largest molecular weight. Further, the predefined directional pattern can comprise one, two or more different directions. Still further, the direction forming element and the gas separation element may be at least partially overlap (i.e., be distinctly separate, overlap or partially overlap).

According further to the first aspect of the invention, the gas mixture may be a predefined atmospheric air comprising gases of oxygen (O2) and nitrogen (N2), where the first enriched gas is an oxygen-enriched gas/air, the second gas mixture is a nitrogen-enriched gas/air, and the gas mixture of the plurality of gases is a predefined atmospheric air. Further, the apparatus then can comprise a fossil-fuel burning vehicle containing an automobile, a motorcycle, a truck, an aircraft, a ship, a bus or a rocket, or a fossil-fuel burning apparatus containing a power generator, a power plant, a heater or a furnace, where each of the fossil-fuel burning vehicles and apparatuses can be driven by an engine comprising a combustion chamber or one or more combustion chambers/spaces and can be configured to use the oxygen-enriched gas for combustion, and the nitrogen-enriched gas for one or more of: cooling of the engine or a transmission of the apparatus, for reducing explosivity of a fuel tank, and for improving combustion or exhaust performance. Further, the predefined atmospheric air can be provided: directly from an atmosphere, or by a fan-driven device comprising an impeller, a compressor, supercharger or a turbocharger.

Still further, according to the above aspect, the apparatus can comprise an engine comprising the combustion chamber and one or more exhaust sensors analyzing a composition of an exhaust gas from the combustion chamber for providing a feedback signal for fine tuning of the oxygen-enriched gas/air entering the at least one collector gate in order to meet exhaust standards, where the fine tuning can be provided by one or more of: a) a corresponding small adjustment of an aperture of the at least one collector gate, b) a corresponding small adjustment of a position of the at least one collector gate, c) changing/tuning a configuration of the gas separation element, d) changing a pressure of the entered gas mixture at the input port, and e) changing a temperature of the entered gas mixture at the input port. The one or more exhaust sensors can comprise one or more of: a temperature sensor, a particulate sensor, a carbon oxide sensor, a carbon dioxide sensor, an oxygen sensor, a water sensor, a carbon monoxide sensor, and a nitrogen oxide sensor.

Still yet further, according to the above aspect, the apparatus can comprise a nitrogen sensor for analyzing one or both, nitrogen content and temperature, of the nitrogen-enriched gas/air, provided to facilitate tuning of one or both a desired nitrogen content and a desired temperature, which can be provided by one or more of: a) a corresponding small adjustment of an aperture of the at least one further collector gate, b) a corresponding small adjustment of a position of the at least one further collector gate, c) changing/tuning a configuration of the gas separation element, d) changing a pressure of the entered gas mixture at the input port, and e) changing a temperature of the entered gas mixture at the input port.

According further to the first aspect of the invention, the apparatus can comprise a tube-like elongated element curved in one plane with a curve sign never being a zero, where a first open end of the tube-like elongated element can be configured as the input port for entering the gas mixture of the plurality of gases, the internal wall of the tube-like elongated element can be configured to provide functionality of the direction forming element and of the gas separation element, so that the first enriched gas is preferably collected near an internal outward curved surface of the internal wall, and the second enriched gas is preferably collected near an internal inward curved surface of the internal wall, and a second end opening of the tube-like elongated element can be configured to provide the at least one collector gate and the at least one further collector gate to separately collect the first enriched gas and the second enriched gas. Further, a cross-section of the first open end can be larger than a further cross section of the second open end. Still further, a cross section of the tube-like elongated element can be rectangular, ellipse-like or circular. Still yet further, the tube-like elongated element curved in the one plane can have a shape of a Fibonacci curve, a circle, an ellipse or a parabola. Further still, a portion of the internal wall of the tube-like elongated element may comprise a predefined pattern of holes/openings for collecting the second enriched gas in an additional compartment which can be configured as the at least one further collector gate for collecting the second enriched gas, so that the first enriched gas may be collected through the second end opening of the original tube-like elongated element which can be configured as the at least one collector gate. Moreover, the tube-like elongated element can share one input port with one or more other tube-like elongated elements of an identical or of a substantially similar design.

According further to the first aspect of the invention, the apparatus can comprise a distribution gas/air pipe/rail providing/circulating the gas mixture, where the at least one air separator can comprise a plurality of gas/air separators, so that the distribution gas/air pipe/rail can comprise corresponding input ports for entering the gas mixture separately to each of the plurality of the gas/air separators According still further to the first aspect of the invention, the direction forming element can be configured to split the entered gas mixture into at least two branches, each branch having two curved outward walls at least in one plane; the gas separation element can comprise curved portions of the at least two branches, where an internal curved outward wall of the two curved outward walls in each branch can be partially removed, so that the second gas can enter an area between the at least two branches to form the second gas mixture comprising the second enriched gas; the at least one collector gate may comprise two collector gates configured to collect the first gas mixture comprising the first enriched gas from ends of the at least two branches respectively, where the at least one surface may be an external curved outward wall of the two curved outward walls in each branch; and the at least one further collector gate can be configured to collect the second gas mixture comprising the second enriched gas from the area between the at least two branches. Still further, the internal curved outward wall of the two curved outward walls in each branch can be partially removed by using a predefined pattern of holes/openings in the internal curved outward wall for more efficient gas separation, so that the second gas can substantially enter the area between the at least two branches through the predefined pattern of holes/openings to form the second gas mixture comprising the second enriched gas.

According yet further to the first aspect of the invention, the direction forming element can be configured to provide one or more streams of the gas mixture swirling in a tangential direction matching a predetermined internal diameter of a cylinder; the gas separation element can comprise the cylinder, so that while swirling the gas mixture along an internal wall of the cylinder, the first gas can preferably stay near a surface of the internal wall of the cylinder forming the first gas mixture, and the second gas can substantially enter an area inside the cylinder forming the second gas mixture; the at least one collector gate can be configured to collect the first gas mixture comprising the first enriched gas near the internal wall of the cylinder; and the at least one further collector gate can be configured to collect the second gas mixture comprising the second enriched gas from the area inside the cylinder. Still further, the gas separation element can further comprise a hollow cylinder symmetrically placed inside the cylinder, the hollow cylinder having a predefined pattern of holes/openings on side walls and identifying the area inside of the hollow cylinder, so that the second gas can enter the area inside the hollow cylinder through the predefined pattern of holes/openings to form the second gas mixture having the second enriched gas in the area; and the first gas can predominantly stay between corresponding surfaces of the internal wall of the cylinder and of an external wall of the hollow cylinder. Moreover, the direction forming element can be implemented as a thread with deep trenches on an external wall of one end of the cylinder to create a swirling in the tangential direction matching the predetermined internal diameter of the cylinder. Yet still further according to the first aspect of the invention, the direction forming element can be configured to form a predefined directional pattern of the gas mixture against a plurality of flat surfaces, and the gas separation element may comprise at least one flat surface of the plurality of flat surfaces, the at least one flat surface having a predefined pattern of holes/openings in order to separate the first enriched gas and the second enriched gas.

According to a second aspect of the invention, a method, comprising: entering a gas mixture of a plurality of gases having different molecular weights at an input port; forming a predefined directional pattern of the gas mixture by a direction forming element; providing an output from the direction forming element at least along a surface of a gas separation element to spatially separate in part the plurality of gases, where gases with a larger molecular weight out of the different molecular weights are concentrated closer to the at least one surface; collecting, using at least one collector gate, a first gas mixture enriched with a first gas (a first enriched gas) near the surface, the first gas having a largest molecular weight of the different molecular weights; and collecting using at least one further collector gate placed in a vicinity of the at least one first collector gate but located further away from the surface than the at least one first collector, and configured to collect a second gas mixture enriched with a second gas (a second enriched gas), the second gas having a smaller molecular weight than the largest molecular weight.

According further to the second aspect of the invention, the gas mixture may be a predefined atmospheric air comprising gases of oxygen (O2) and nitrogen (N2), where the first enriched gas may be an oxygen-enriched gas/air, the second gas mixture may be a nitrogen-enriched gas/air, and the gas mixture of the plurality of gases may be a predefined atmospheric air. Further, the method can further comprise: providing the collected oxygen-enriched gas/air to a combustion chamber of an apparatus; determining whether the exhaust gas of the combustion process is in compliance with exhaust standards, using a plurality of one or more exhaust sensors analyzing a composition of the exhaust gas; and providing a feedback signal for fine tuning of the oxygen enriched gas/air entering the at least one collector gate in order to meet the exhaust standards, the fine tuning is provided by one or more of: a) a corresponding small adjustment of an aperture of the at least one collector gate, b) a corresponding small adjustment of a position of the at least one collector gate, c) changing/tuning a configuration of the gas separation element, d) changing a pressure of the entered gas mixture at the input port, and e) changing a temperature of the entered gas mixture at the input port.

Still further, according to the above aspect, before providing the collected oxygen-enriched gas/air to a combustion chamber of the apparatus for a combustion process, the method may further comprise: determining whether the collected oxygen-enriched gas/air has a desired portion of oxygen, using at least one oxygen-content gas sensor; and providing a feedback signal for preliminary tuning at least for the desired portion of oxygen in the oxygen-enriched gas/air, the preliminary tuning may be provided by one or more of: a) a corresponding small adjustment of an aperture of the at least one collector gate, b) a corresponding small adjustment of a position of the at least one collector gate, c) changing/tuning a configuration of the gas separation element, d) changing a pressure of the entered gas mixture at the input port, and e) changing a temperature of the entered gas mixture at the input port.

Still further, according to the above aspect, the method may further comprise: using the collected nitrogen-enriched gas/air in the apparatus for one or more of: cooling of an engine of the apparatus, for reducing explosivity of a fuel tank, and for improving combustion or exhaust performance. Moreover, the method may further comprise: determining whether the collected nitrogen-enriched gas/air has a desired portion of nitrogen, using at least one nitrogen-content gas sensor; and providing a feedback signal for tuning of the desired portion of nitrogen in the nitrogen-enriched gas/air, the tuning may be provided by one or more of: a) a corresponding small adjustment of an aperture of the at least one further collector gate, b) a corresponding small adjustment of a position of the at least one further collector gate, c) changing/tuning a configuration of the gas separation element, d) changing a pressure of the entered gas mixture at the input port, and e) changing a temperature of the entered gas mixture at the input port.

BRIEF DESCRIPTION OF THE DRAWINGS

These and other features and aspects of the present disclosure will become better understood when the following detailed description is read, with reference to the accompanying drawings, in which like characters represent like parts throughout the drawings, wherein:

FIGS. 3A-3C are exemplary non-limiting views demonstrating further developments of a concept demonstrated in FIGS. 2A-2B, according to various embodiments of the invention;

DETAILED DESCRIPTION

Figure 1:
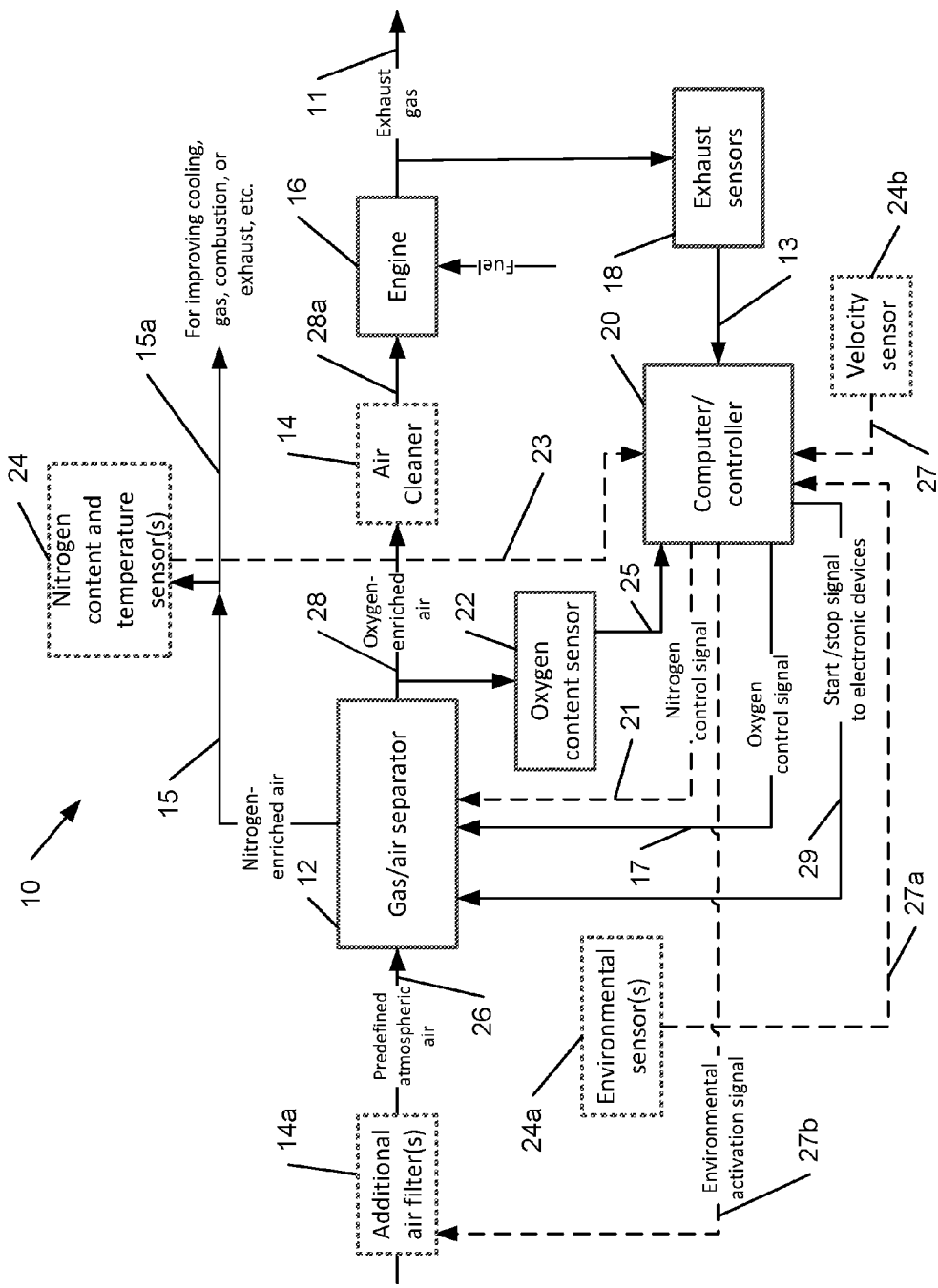
FIG. 1 is an exemplary block diagram of an apparatus/device for continuously providing an oxygen-enriched gas/air as well as a nitrogen-enriched gas/air using a partial gas separation technique, according to various embodiments of the invention.

New apparatus and method are presented for a partial gas separation technique which can be used, e.g., for continuously providing, using a predefined atmospheric air (normally atmospheric air comprises 78% of nitrogen $N_2$ and 21% of oxygen $O_2$), oxygen-enriched gas/air in fossil-fueled combustion devices/systems to a combustion area/chamber for improving combustion, exhaust and related properties of the apparatus. The partial gas separation technique can be based on forming a predefined directional pattern of a gas mixture of a plurality of gases, using a direction forming element, subsequently moving an output gas from the direction forming element at least along/against one surface of a gas separation element to spatially separate in part the plurality of gases having different molecular weights, as described herein. The direction forming element and the gas separation element can be distinctly separate, overlap or at least partially overlap.

According to a further embodiment of the invention, a nitrogen-enriched (oxygen-depleted) gas/air can be further provided from a predefined atmospheric air using the partial gas separation technique for generating and collecting the nitrogen-enriched gas/air. The collected nitrogen-enriched gas/air, which may be cooler than the predefined atmospheric air, can be channeled as desired and used for automatically improving one or more apparatus parameters such as a) cooling of an engine, transmission and other parts of the apparatus; b) providing better safety of a fuel tank by providing a less combustible space, and/or c) improving combustion or exhaust performance.

According to various embodiments of the invention, the predefined atmospheric air may be pulled naturally from the atmosphere, may be provided through an opening in a device or a moving body/vehicle. Moreover, it can be pressurized atmospheric air provided by a fan-driven device such as a compressor, an impeller, a supercharger, a turbocharger or the like.

Continually providing oxygen-enriched gas/air may enable fossil fuels to burn more rapidly and completely, producing more power and lower emissions. This can have a widespread impact to a wide variety of industries, including (but not limited to) transportation, power production, defense, agriculture, construction, manufacturing, and heating. The potential applications may include various devices driven by combustion engines such as devices comprising combustion chambers or one or more combustion spaces. These devices may comprise fossil-fuel burning vehicles which can include automobiles, motorcycles, trucks, buses, trains, aircrafts, ships, rockets, construction and farming equipment, military tanks, and the like. Moreover, such devices may also be fossil-fuel burning apparatuses such as power generators, heaters, furnaces, as well as power plants, and the like.

According to a further embodiment, the apparatus/device may comprise an oxygen content sensor for analyzing oxygen content of the collected oxygen-enriched gas/air to provide preliminary tuning for attaining a desired portion of oxygen in the oxygen-enriched gas/air. The oxygen preliminary tuning can be provided by one or more of: a) a corresponding small adjustment of an aperture of the at least one collector gate, b) a corresponding small adjustment of a position of the at least one collector gate, c) changing/tuning a configuration of the gas separation element, d) changing a pressure of the entered gas mixture at the input port, and e) changing a temperature of the entered gas mixture at the input port.

Moreover, the apparatus/device may further comprise one or more exhaust sensors (e.g., one or more of: a temperature sensor, a particulate sensor, a carbon dioxide sensor, an oxygen sensor, a water sensor, a carbon monoxide sensor, a nitrogen oxide sensor and the like) for analyzing a composition of an exhaust gas from the combustion chamber (or combustion spaces) to provide a feedback signal for fine tuning of the oxygen-enriched gas/air and/or for fine tuning of the nitrogen enriched gas/air entering corresponding collector (gas) gates in order to meet exhaust standards. The oxygen and/or nitrogen fine tuning can be provided by corresponding small shifts/adjustments of location(s)/opening size(s) of the corresponding gate(s)/aperture(s), by changing/tuning a configuration of the gas separation element, as described herein, and/or using other means, such as changing a pressure/temperature of the entered gas mixture at an input port of a gas/air separator.

According to another embodiment, the apparatus/device may comprise a nitrogen content sensor for analyzing nitrogen content and/or temperature of the collected nitrogen-enriched gas/air to facilitate nitrogen content tuning. The nitrogen/temperature fine tuning can be provided by corresponding small shifts/adjustments of location(s)/opening size(s) of the corresponding gate(s)/aperture(s), by changing/tuning a configuration of the gas separation element, as described herein, and/or using other means, such as changing a pressure/temperature of the entered gas mixture at an input port of a gas/air separator.

A computer system of the apparatus/device can provide start/stop commands/signals to corresponding drivers, motors, power supplies and the like to activate/de-activate corresponding sensors, collector (gas) gates/apertures and the like, according to a predefined algorithm imbedded in the design of the apparatus/device. For example, the starting command may coincide with turning on of the apparatus, so that the oxygen-enriched and/or nitrogen-enriched gases can be provided right away to the corresponding modules. Alternatively, the apparatus may have a separate (primary) start-up system, so that activating the corresponding sensors, collector (gas) gates/apertures and others can start when the apparatus reaches a threshold speed or falls below a threshold speed (see examples presented in FIGS. 1 and 9). In other words, when the apparatus speed goes below a threshold speed or reaches the threshold speed, the primary start-up system can be turned on/turned off respectfully, while the secondary system can be completely or partially turned off/turned on respectively. The computer system can comprise logic (application program(s)) for providing logical functionality of the start/stop command signals to the appropriate modules of the apparatus/device to control the appropriate order of use.

A partial gas separation technique is discussed next in reference to a variety of embodiments of the inventions. According to one embodiment, an apparatus can comprise a gas/air separator comprising at least an input port, a direction forming element and a gas separation element. The input port can provide entering a gas mixture of a plurality of gases having different molecular weights. The entered gas mixture then can be provided to the direction forming element, configured to intake the gas mixture entered through the input port, to form a predefined directional pattern of the gas mixture (which can comprise, e.g., one path, two paths, etc.,). The output gas from the direction forming element can be provided to the gas separation element having one or more surfaces, so this output gas can be provided along/against the at least one surface (of the one or more surfaces) to partially separate in space the plurality of gases, where gases with a larger molecular weight out of the different molecular weights may be concentrated closer to the at least one surface. The apparatus can further comprise a plurality of gas/air collector gates (or for simplicity "a plurality of collector gates"), so that at least one collector gate (i.e., one or more collector gates) may be used to collect a first gas mixture enriched with a first gas (a first enriched gas) near the at least one surface, where the first gas having a largest molecular weight. Moreover, at least one further collector gate (i.e., one or more further collector gates) placed in a vicinity of the at least one collector gate but located further away from the at least one surface than the at least one collector gate, can be used to collect a second gas mixture enriched with a second gas (a second enriched gas), the second gas having a smaller molecular weight than the largest molecular weight. As noted above, the direction forming element and the gas separation element can be distinctly separate, overlap or at least partially overlap.

According to a further embodiment, an apparatus for a partial gas separation can comprise a tube-like elongated element curved at least in one plane with a curve sign never being a zero (i.e., curve's coordinate derivative never goes to zero preventing a change of sign of the curvature), where a first open end of the tube-like elongated element can be configured as the input port for entering the gas mixture of the plurality of gases. Moreover, an internal wall of the tube-like elongated element can be further configured to provide functionality of the direction forming element and of the gas separation element simultaneously. As a result, due to a mass/density separation of gases having different molecular weights, the first enriched gas, having the largest molecular weight of the enriched component, may be preferably/substantially/primarily collected near an internal outward curved surface of the internal wall of the tube-like elongated element. Furthermore, the second enriched gas, having a smaller molecular weight than the first enriched gas, may be preferably/substantially/essentially collected near an internal inward curved surface of the internal wall of the tube-like elongated element. The collection of the corresponding enriched gases can be provided at a second end opening of the tube-like elongated element, which may be used to provide the at least one and the at least one further collector gates to separately collect the first enriched gas and the second enriched gas (see non-limiting examples of FIG. 2A).

Furthermore, according to another embodiment, a portion of the inward curved surface of the tube-like elongated element, discussed above, can comprise a predefined pattern of holes/openings for collecting the second enriched gas in an additional compartment which can be used as the at least one further collector gate. Then the first enriched gas can be collected through the second end opening of the original tube-like elongated element which can be used as the at least one collector gate (see a non-limiting example in FIG. 2B)

It is noted that according to various embodiments, the tube-like elongated element curved at least in one plane may have a shape of a Fibonacci curve, a circle, an ellipse, a parabola or the like. The curved profile can be also implemented as a plurality of short straight lines with a median comprising a desired curve profile. Moreover, a cross section of the tube-like elongated element may be rectangular, circular, ellipse-like and the like. Also a cross-section of the first open end of the tube-like elongated element can be larger than a further cross section of the second open end of the tube-like elongated element (see examples in FIGS. 2A-2B and 3A-3B).

According to a further embodiment of the invention, a portion/percentage of an enriched gas in a collected enriched gas mixture (e.g., the first enriched gas, the second enriched gas, etc., such as oxygen-enriched or nitrogen-enriched, etc.) can be finely tuned, during apparatus operation, using a position/location of the collector gate and/or an opening size of an aperture used within the collector gate or as a stand-alone element (i.e., the aperture may be a part of the collector gate or may be used as a stand-alone element). This fine tuning can provided using a spatial gas distribution of a desired enriched gas at an output of the gas separation element. Therefore shifting the aperture/gate along the spatial distribution of the output of the gas separation element, and/or changing an aperture opening size relative to this distribution can change the portion/percentage of a desires gas in the collected enriched gas mixture (e.g., see FIGS. 2-6). Also, the portion/percentage and the spatial gas distribution of the desired enriched gas at the output of the gas separation element can be finely tuned by changing a configuration of the gas separation element, as shown in FIGS. 7A-7B. Moreover, another way to finely vary the portion/percentage of an enriched gas in a collected enriched gas mixture may be facilitated by changing a pressure and/or temperature of the entered gas mixture at an input port of a gas/air separator.

Figure 2A:
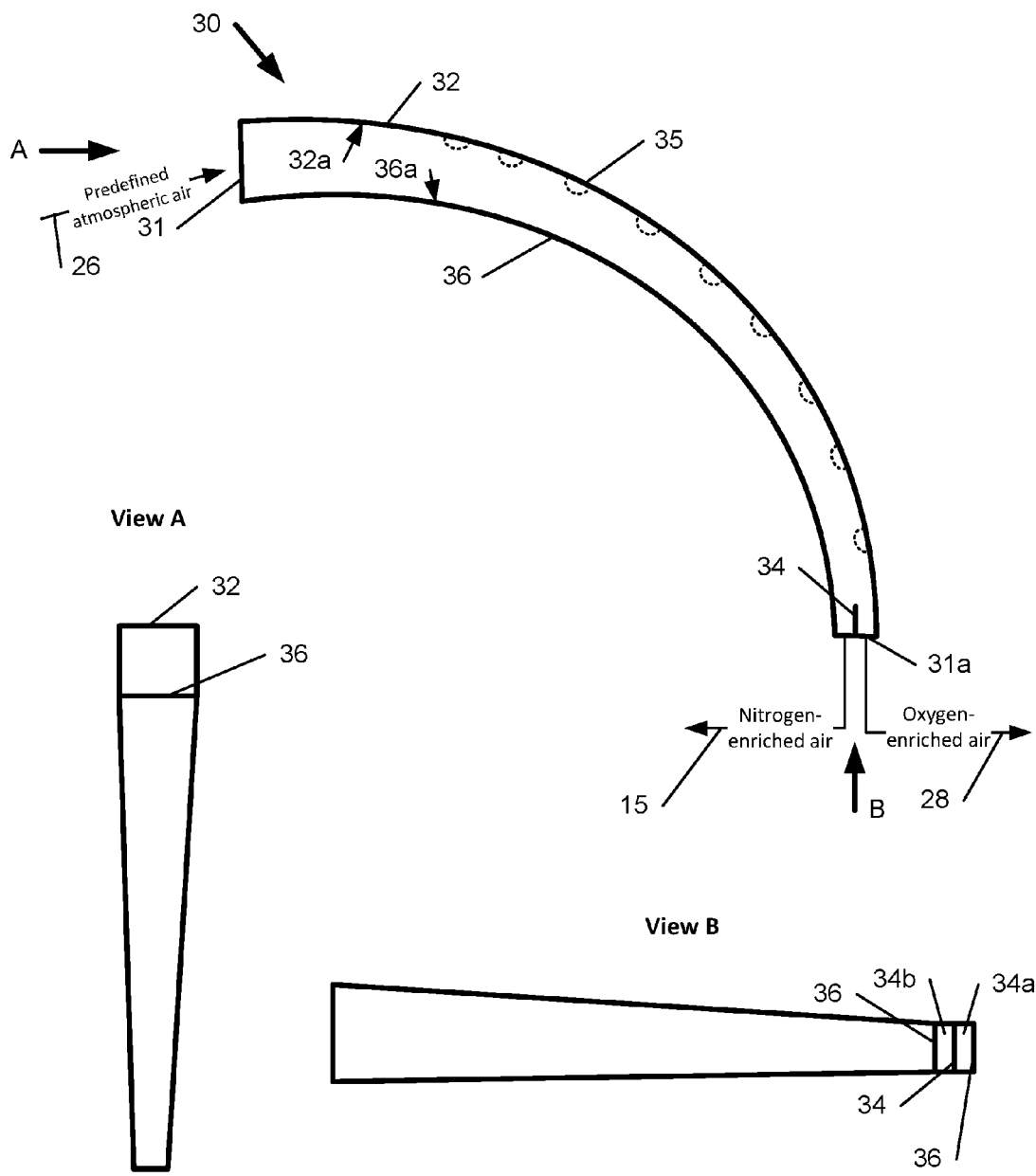
FIGS. 2A and 2B are exemplary non-limiting views of an apparatus comprising a tube-like elongated elements curved in at least one plane, according to an embodiment of the invention.
Figure 2B:
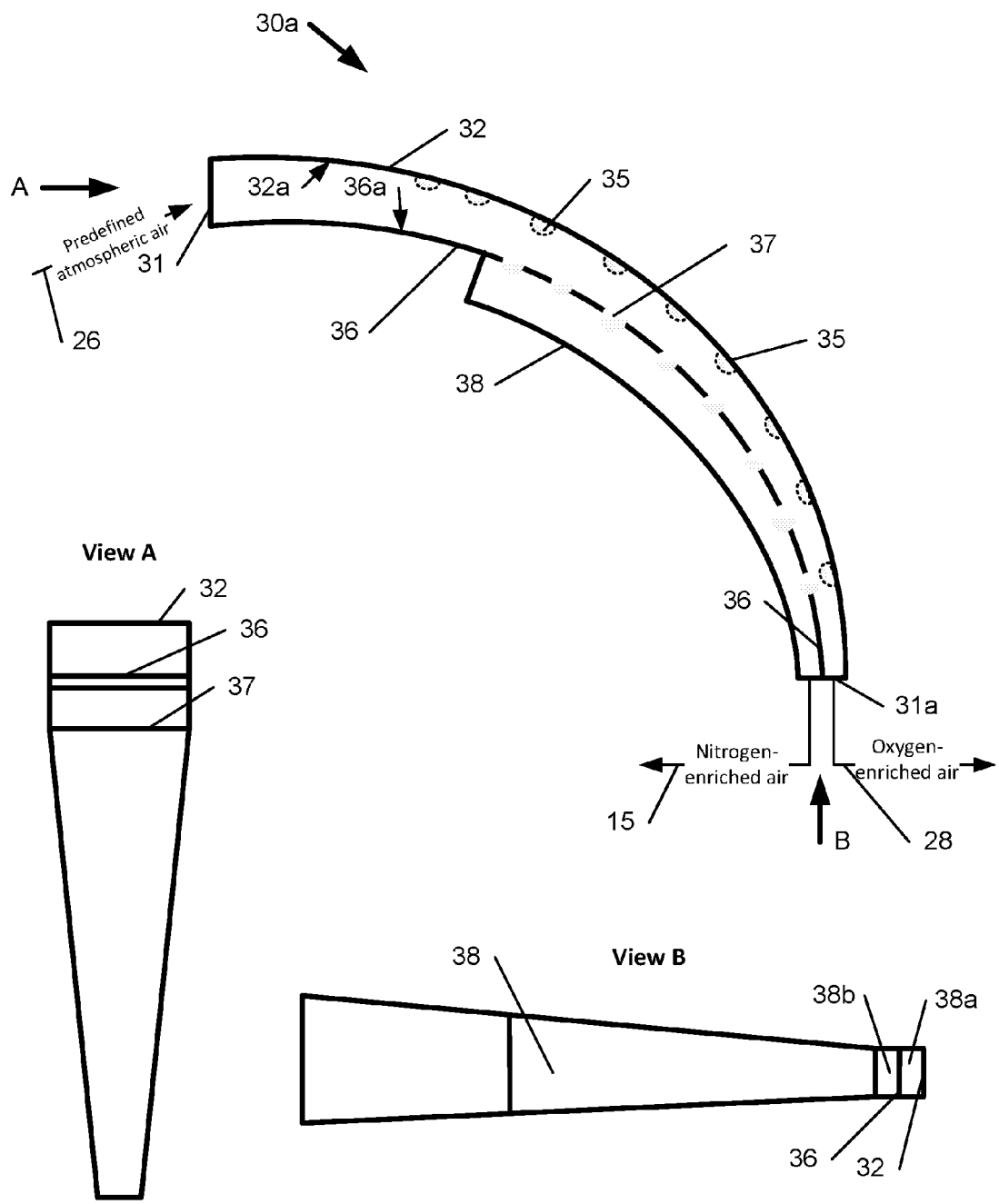
Figure 3A:
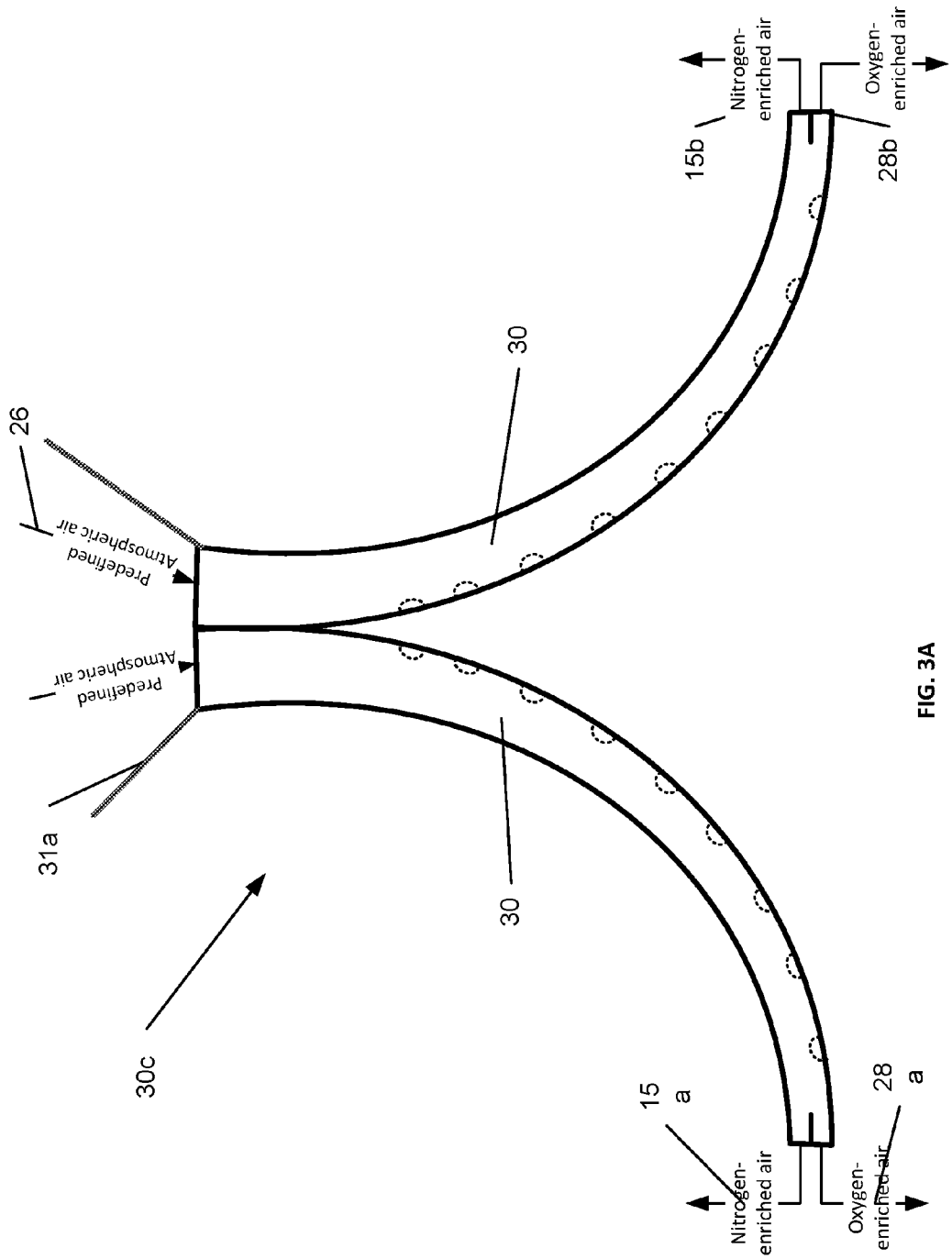
Figure 3C:
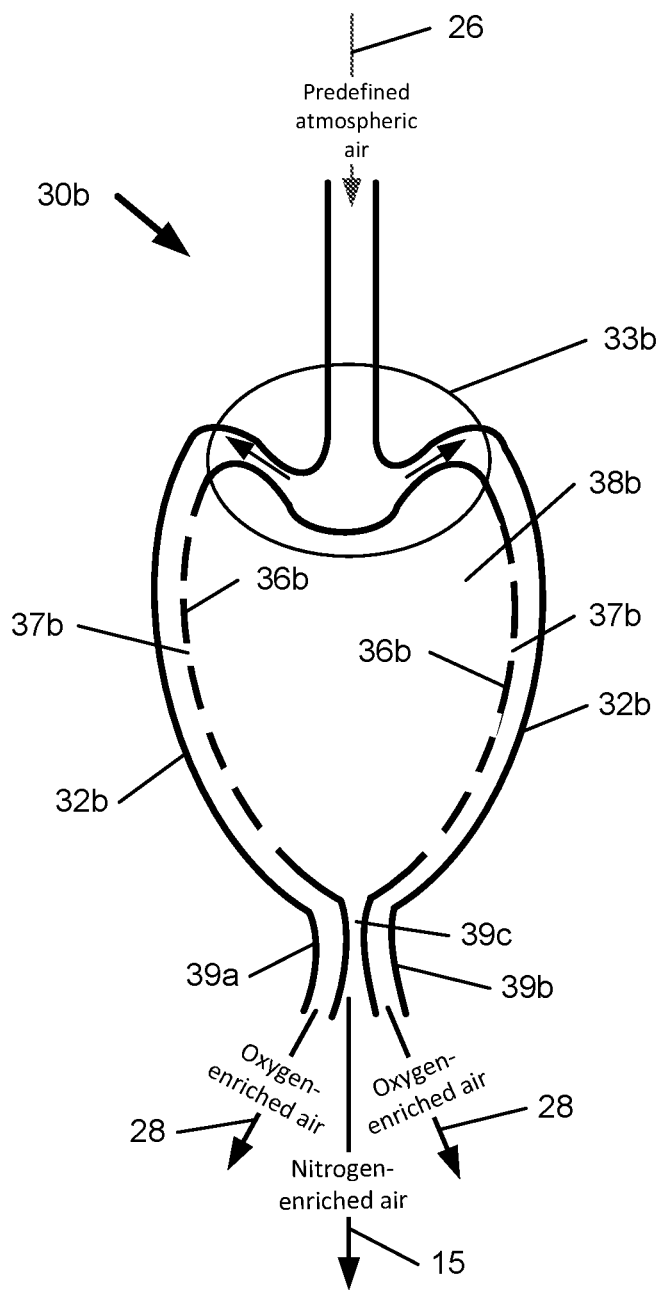

According to another embodiment of the invention, an apparatus for a partial gas separation, discussed herein, can comprise the direction forming element configured to split the entered gas mixture at least into two (or more than two) separate branches (identical and non-identical), each branch having two curved outward walls in one plane (for example as shown in FIG. 3C). Moreover, the gas separation element can comprise curved portions of the two branches, where the at least one surface attracting the first enriched gas (as discussed above) is a curved outward wall of the two curved outward walls in each branch and where an internal curved outward wall of the two curved outward walls in each branch can be at least partially removed (using a predefined pattern of holes/openings or extended openings in the internal curved outward wall for adjusting/improving a gas separation efficiency). Then the second gas may predominantly enter an area between the two branches to form the second gas mixture comprising the second enriched gas. Consequently, the at least one collector gate can comprise at least two collector gates configured to collect the first gas mixture comprising the first enriched gas from corresponding ends of the two branches. Then the at least one further collector gate can collect the second gas mixture comprising the second enriched gas from the area between the two branches (see a non-limiting example in FIG. 2B). Further examples of application using a gas/air separator shown in FIGS. 2A and 2B are presented in FIGS. 3A-3B. If more than two branches are used, the operation is similar.

According to a further embodiment of the invention, an apparatus for a partial gas separation, discussed herein, can comprise the direction forming element which can be used to provide one or more streams of the gas mixture swirling in a tangential direction matching a predetermined internal diameter of a cylinder. Furthermore, the gas separation element can comprise this cylinder, so that while swirling the gas mixture along the internal wall of the cylinder, the first gas can stay/concentrate more near the surface of the internal wall of the cylinder forming the first gas mixture, and the lighter second gas can substantially enter an area inside the cylinder forming the second gas mixture. Consequently, the at least one collector gate may be used to collect the first gas mixture comprising the first enriched gas near the internal wall of the cylinder, whereas the at least one further collector gate can be used to collect the second gas mixture comprising the second enriched gas from the area inside the cylinder (see non-limiting examples in FIGS. 4 and 5).

Moreover, the gas separation element having the cylinder as discussed above can further include a hollow cylinder symmetrically placed inside the original cylinder, where the hollow cylinder may have a predefined pattern of holes/openings on side walls. This hollow cylinder with the predefined pattern of holes/openings can identify an area inside of the hollow cylinder to collect the second gas, so that the second gas can enter the area inside the hollow cylinder through the predefined pattern of holes/openings to form the second gas mixture with the second enriched inside the hollow cylinder. Then the first gas can predominantly concentrate between the surface of the internal wall of the cylinder and an external wall of the hollow cylinder (see non-limiting examples in FIGS. 4 and 5).

Figure 6:
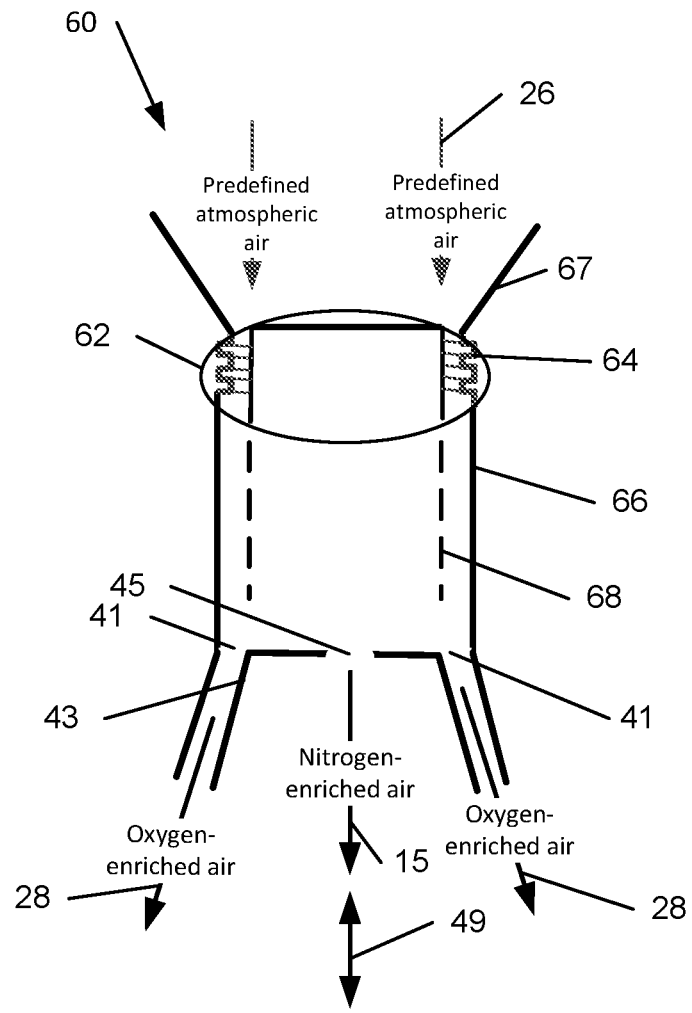
FIG. 6 is a view of a non-limiting example of a gas/air separator using a thread with deep trenches for providing a gas mixture swirling in a tangential direction matching a predetermined internal diameter of a cylinder, according to an embodiment of the invention.
Figure 7A:
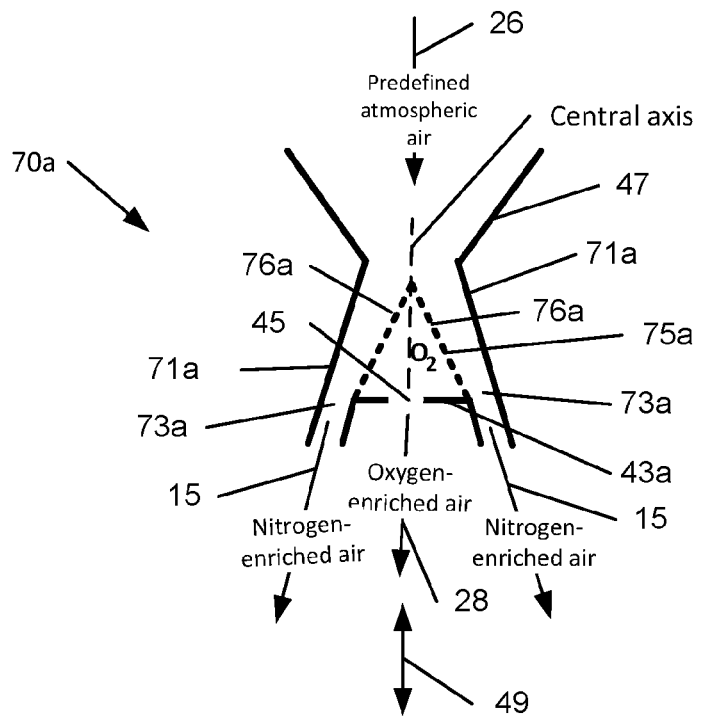
FIGS. 7A and 7B are views of further non-limiting examples of a gas/air separators utilizing gas separation surfaces defined as flat, according to further embodiments of the invention.
Figure 7B:
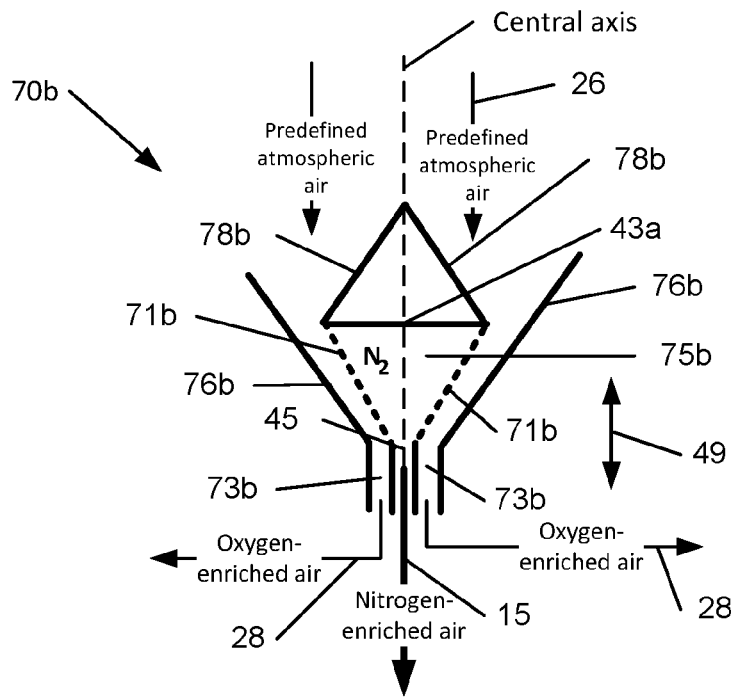

According to a further embodiment of the invention, the direction forming element having a cylinder as discussed above, can have a thread with deep trenches implemented on an external wall of one end of the cylinder (see a non-limiting example in FIG. 6) to create a swirling in the tangential direction matching the predetermined internal diameter of the cylinder (see a non-limiting example in FIG. 6).

According to one more embodiments described herein (see non-limiting examples in FIGS. 7A and 7B), the direction forming element can be can be used to form a pre-defined directional pattern of the gas mixture against one or more flat surfaces comprised in the gas separation element. The gas separation element can further comprise at least one flat surface having a predefined pattern of holes/openings in order to separate the first enriched gas and the second enriched gas. For the purposed of this embodiment, the "flat surface" in the gas separation element can be defined as flat if it is flat in any cross-section of the gas separation element comprising its central axis.

The partial gas separation technique described herein can be applied to a variety of gas mixtures which can comprise binary, ternary, quaternary and other compositions, where gas components having different molecular weights. FIGS.

1-9 demonstrate non-limiting examples of various embodiments of the invention using the partial gas separation technique for a continuous generation of an oxygen-enriched gas/air and a nitrogen-enriched gas/air from a predefined atmospheric air (normally comprising 78% of nitrogen $N_2$ and 21% of oxygen $O_2$), defined above. The gas separation techniques demonstrated in FIGS. 2-7 can be used for a partial separation of other gases beside the atmospheric air, as described herein. It is further noted that identical or similar parts/elements are designated using the same reference numbers in different figures.

FIG. 1 is an exemplary block diagram of an apparatus/device 10 for continuously providing an oxygen-enriched gas/air 28 and a nitrogen-enriched gas/air 15 from a predefined atmospheric air 26, using a gas/air separator 12 utilizing a partial gas separation technique described herein, to automatically improve combustion, exhaust and related properties of the apparatus. FIG. 1 is a simplified block diagram of the device 10 that is suitable for practicing the exemplary embodiments of this invention, e.g., in reference to FIGS. 2-9, and a specific manner in which components of the apparatus/device 10 can be used to cause the device 10 to operate.

A computer/controller 20 (see FIG. 9 for more details) can be used to generate a start/stop signal 29 such as a starting/stopping command for sensors, collector (gas) gates/apertures and/or corresponding electronics, e.g., when the apparatus 10 is turned on/off, or when the apparatus speed crosses a threshold speed, i.e., "on" when the apparatus speed falls below the threshold speed and "off" when the apparatus speed exceeds the threshold speed. Alternatively, for some applications it may be advantageous to generate "on" signal when the apparatus speed exceeds the threshold speed and "off" signal when the apparatus speed falls below the threshold speed.

The apparatus speed can be monitored by a velocity sensor 24b and reported (signal 27) to the computer/controller 20 (see FIG. 1). Then, upon generating the start signal "on", the predefined atmospheric air 26 can be pulled through air entry port(s) in a device/apparatus or a vehicle, (e.g., directly from an atmosphere or provided by a compressor, a turbocharger or the like as a pressurized atmospheric air, as described above).

According to a further embodiment, before providing the generated oxygen-enriched gas/air 28 to an engine 16 for combustion, it can be determined whether the oxygen-enriched gas/air 28 has a desired portion of oxygen, using at least one oxygen-content gas sensor 22. The readout 25 of the sensor 22 can be continuously provided to the computer/controller 20, which can make a determination using an appropriate program application, whether the oxygen-enriched gas/air 28 has the desired oxygen ($O_2$) content. If not, an oxygen control signal 17 can be provided to the gas/air separator 12 for adjusting the content of oxygen using fine adjustments as described herein.

The nitrogen-enriched gas/air 15 can also be monitored to determine whether it has a desired portion of nitrogen, using nitrogen-content gas and/or temperature sensor(s) 24. The readouts 23 of the sensor(s) 24 can be continuously provided to the computer/controller 20, which can make a determination using an appropriate program application, whether the nitrogen-enriched gas/air 15 has the desired nitrogen ($N_2$) content and/or temperature. If not, then a nitrogen control signal may be provided to the gas/air separator 12 to adjust the content of nitrogen and/or temperature, using fine adjustments as described herein. Then the nitrogen-enriched gas/air 15a with the desired nitrogen ($N_2$) content and/or temperature can be used for various purposes, e.g., for improving cooling of an engine 16, for providing safety of a fuel tank by filling the space left by voided fuel, for optimizing the combustion process and/or improving exhaust performance.

Moreover, after adjusting the oxygen content, the oxygen-enriched gas/air 28 may go through an air cleaner filter 14, so that the cleaned oxygen-enriched gas/air 28a can be provided to a combustion chamber (place(s)) of the engine 16 as shown in FIG. 1. It is noted that the air cleaner, which is similar to the air cleaner 14, can be used instead or in addition elsewhere in the system, e.g., before the gas/air separator 12 and/or even before the compressor, impeller or turbocharger, if used. It is further noted that environmental sensor(s) 24a can provide a further capability to clean the predefined atmospheric air 26, e.g., from excessive water, dust, debris and the like, before it enters the gas/air separator 12. The sensor readout 27a can be provided to the computer/controller 20 to generate a corresponding environmental activation signal 27a for activating additional gas air filter(s) 14a if necessary.

Furthermore, the engine 16 can facilitate the combustion process, using the cleaned oxygen-enriched gas/air 28a and a corresponding fuel, so that an exhaust gas 11 can be further analyzed by exhaust sensors 18. These sensors (which may include one or more of: a temperature sensor, a carbon oxide sensor, a carbon dioxide sensor, an oxygen sensor, a water sensor, a carbon monoxide sensor, a nitrogen oxide sensor and the like) can provide corresponding sensor readings 13 to the computer/controller 20. Then the computer/controller 20 can make a determination, using the appropriate program application(s), whether further adjustment of the oxygen content in the oxygen-enriched gas/air 28a and possibly of the nitrogen in the nitrogen-enriched gas/air 15a may be necessary. If this is the case, the computer/controller 20 can provide oxygen and nitrogen control signals 17 and 21 respectively to the gas/air separator 12 for performing necessary adjustments as described herein.

FIGS. 2A and 2B are exemplary non-limiting views of an apparatus comprising a tube-like elongated element 30 or 30a curved in one plane with a curve sign never being a zero, according to an embodiment of the invention. A first open end 31 of the tube-like elongated element 30 or 30a can be configured as the input port for entering the predetermined atmospheric air (or gas mixture of the plurality of gases in general), preferably directed toward a surface 32a. Internal surfaces 36a and 32a of external (outward) and internal (inward) walls 32 and 36 respectively can be used to provide functionality of the direction forming element (along the curve) and of the gas separation element.

In FIG. 2A the oxygen-enriched gas/air (first enriched gas) is substantially/essentially, collected near an outward curved surface 32a of the tube-like elongated element 30, and the nitrogen-enriched gas/air (second enriched gas) is substantially/essentially collected near an inward curved surface 36a of the tube-like elongated element 30. A second end opening 31a of the tube-like elongated element 30 may be used to provide the at least one collector gate 34a and the at least one further collector gate 34b separated by a wall 34 to collect the oxygen-enriched gas/air 28 (the first enriched gas) and the nitrogen-enriched gas/air 15 (the second enriched gas) respectively.

The principle of gas separation can be explained by conservation of momentum, i.e., the heavier molecules of oxygen ($O_2$) pushed against the internal wall 32a of the external wall 32 attain a slower speed than lighter molecules of nitrogen ($N_2$), so that the oxygen molecules have a tendency to stay nearer to the surface 32a than the lighter nitrogen molecules. This leads to a density/mass gradient, so that the oxygen molecules concentrate more near (closer to) the surface 32a of the external wall 32, whereas nitrogen molecules concentrate more away from the surfaces 32a closer to the surface 36a. The curvature of the surfaces 32a and 36a reinforce/multiply this phenomenon due to inertia effects further forcing heavier (oxygen) molecules to stay near the surface 36a.

Furthermore, in the example of FIG. 2A, a cross-section of the first open end 31 of the tube-like elongated element 30 can be larger than a further cross section of the second open end 31a, for generating more condensed gas. According to a further embodiment, a cross section of the tube-like elongated element 30 can be rectangular, circular or the like (the same in applicable to the tube-like elongated element 30a in FIG. 2B).

FIGS. 2A-2B also show, that according to a further embodiment of the invention, the internal surface 32a can comprise nodes (like small speed bumps, dips, or fins) 35 which may be added on the surface 32a to maximize the collection/density of oxygen in the oxygen-enriched air near the surface 32a. It is further noted that a roughness on the surface 32a can help to trap the oxygen molecules near the surface 32a and to collect more efficiently the oxygen-enriched gas 28 at the corresponding gates. This principle can be applied in all non-limiting examples shown in FIGS. 2-7 described herein.

It is further noted, that according to an embodiment of the invention, at least one collector gate 34a in FIGS. 2A and/or 34b in FIG. 2B, and the at least one further collector gate 38a in FIGS. 1 and/or 38b in FIG. 2B can have further capabilities not shown in FIGS. 2A and 2B. These components may have opening adjustable apertures and position adjustable collector gates. Therefore, the fine tuning of a desired portion/percentage of enriched gas (e.g., oxygen-enriched and/or nitrogen-enriched) can be implemented by corresponding small shifts/adjustments of location(s)/opening size(s) of the corresponding gate(s)/aperture(s). Furthermore, as stated above, the fine tuning can be implemented using other means, such as changing a pressure/temperature of the entered gas mixture at an input port of a gas/air separator. These principles/considerations can be applied to all non-limiting examples shown in FIGS. 2-7 described herein.

In FIG. 2B, the concept of FIG. 2A is further developed where a portion of the internal wall 36 can comprise a predefined pattern of holes/openings 37 for collecting the nitrogen-enriched gas/air (second enriched gas) through an additional compartment 38 which can be configured having the at least one further collector gate for collecting the nitrogen-enriched gas/air through the opening 38b, so that the oxygen-enriched gas/air (first enriched gas) may be collected through the second end opening 38a of the original tube-like elongated element 30a which can be used as the at least one collector gate.

FIGS. 3A-3C are exemplary non-limiting views demonstrating further developments of a concept demonstrated in FIGS. 2A and 2B, according to various embodiments of the invention. FIG. 3A demonstrates an embodiment where the tube-like elongated element 30 can shares one input port 31a with one or more other identical tube-like elongated elements 30 and/or with one or more tube-like elongated elements, having a substantially similar design. Each of the two shown tube-like elongated elements 30 separately provides the oxygen-enriched gas/air 28a and 28b and the nitrogen-enriched gas/air 15a and 15b respectively. The example shown in FIG. 3A is for two elements 30 having curvatures in opposite directions, but this principle can be applied to more than two tube-like elongated elements 30 in three-dimensional space having the same or different directions of the their respective curvatures, and the same/similar (e.g., stacked to each other) or dissimilar designs. Output enriched gases from the tube-like elongated elements 30 can provide in a timely fashion, for example, the oxygen-enriched gas/air as well as the nitrogen-enriched gas/air to different cylinders of the vehicle engine for different phases of its operation, e.g., the oxygen-enriched gas/air for a burning cycle and the nitrogen-enriched gas/air for the cooling cycle in each cylinder.

FIG. 3B demonstrates an embodiment where an apparatus further comprises a distribution gas/air pipe/rail 31b which can provide (circulate) a predefined atmospheric air 26. The distribution gas/air pipe/rail 31b can comprise corresponding input ports for entering the predefined atmospheric air 26 separately to each of the plurality of the gas/air separators (tube-like elongated elements) 30. As stated above, output enriched gases from the tube-like elongated elements 30 can be provided in a timely manner, for example, to different cylinders of the vehicle engine for different phases of its operation, e.g., the oxygen-enriched gas/air for a burning cycle and the nitrogen-enriched gas/air for the cooling cycle in each cylinder. Moreover, the scheme shown in FIG. 3B can be applied to different types of gas/air separators, e.g., as shown in FIGS. 2-7, and the like, not only for a partial air separation but for separation of various gas mixtures having gas components with different molecular weights as described herein.

FIG. 3C demonstrates an embodiment where an apparatus comprises a multi-branch tube-like elongated element 30b, where the direction forming element 33b is configured to split the entered predetermined atmospheric air (or gas mixture in general) into at least two branches (it can be more than two) for providing the desired air flow directions. Each branch can have two curved outward walls 32b and 36b respectively at least in one plane, where the split gas mixtures being predominantly directed to external curved outward walls 32b in the two branches. A cross section of the two branches may be rectangular, circular, elliptical and the like.

The gas separation element can comprise curved continuations 32b and 36b of the at least two branches respectively. The first (heavier) gas (e.g., oxygen) may primarily concentrate near the surfaces 32b to form the first gas mixture comprising the first enriched gas (e.g., the oxygen-enriched gas), as explained herein. The internal curved outward wall 36b of the two curved outward walls 36b in each branch can be partially removed, using holes/openings 37 in the wall as shown, or using extended openings, as discussed above. Then the second lighter gas (e.g., nitrogen) can enter an area 38b between the at least two branches to form the second gas mixture comprising the second enriched gas (e.g., the nitrogen-enriched gas). Then the two collector gates 39a and 39b can collect the first gas mixture comprising the first enriched gas (the oxygen-enriched gas) 28 from ends of the two branches respectively. The at least one further collector gate 39c can collect the second gas mixture comprising the second enriched gas (nitrogen-enriched gas) 15 from the area 38b between the at least two branches.

Figure 4:
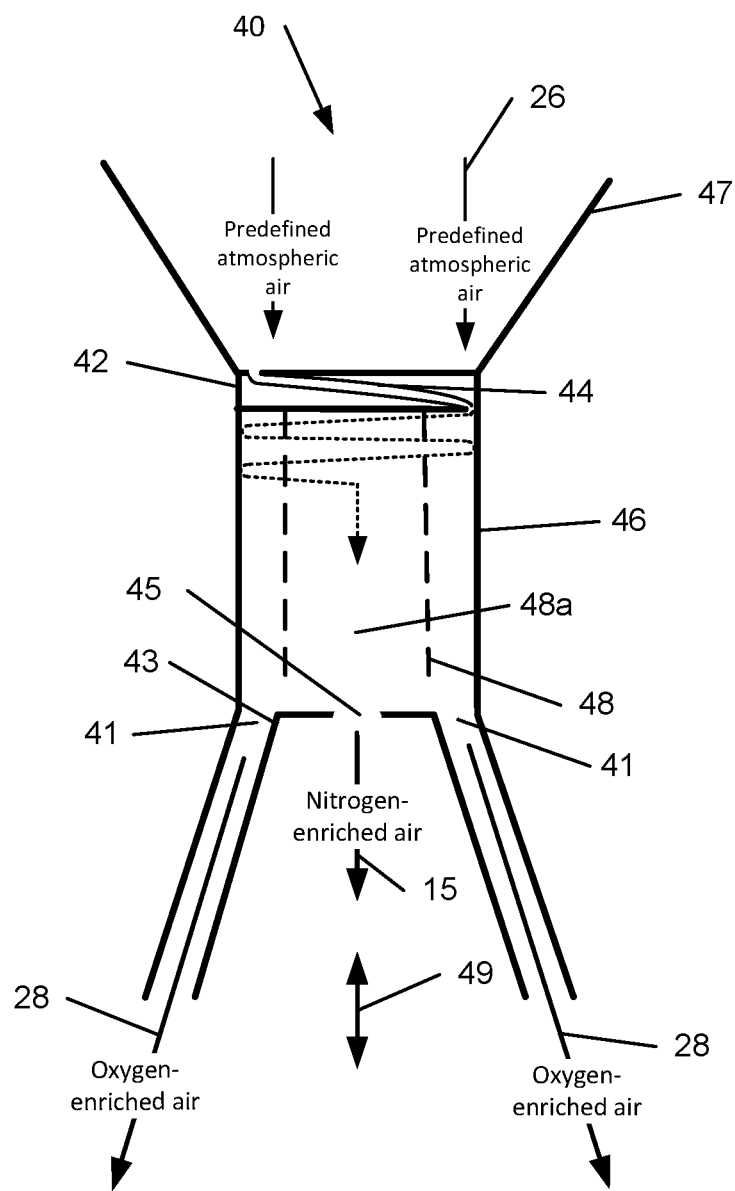
FIG. 4 is a view of a non-limiting example of a gas/air separator using nozzles for a gas mixture swirling in a tangential direction matching a predetermined internal diameter of a cylinder, according to an embodiment of the invention.
Figure 5:
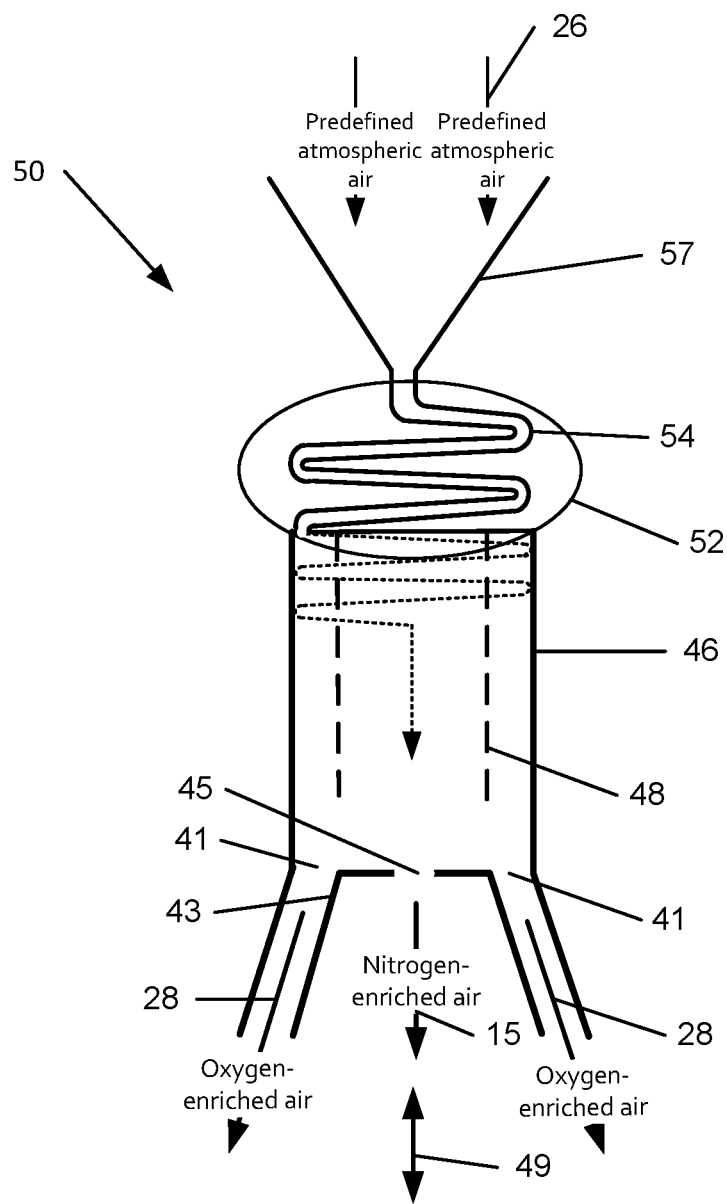
FIG. 5 is a view of a non-limiting example of a gas/air separator using a swirled/twisted tube for providing a gas mixture swirling in a tangential direction matching a predetermined internal diameter of a cylinder, according to an embodiment of the invention.

FIGS. 4-6 are views of further non-limiting examples of a gas/air separators 40, 50 and 60 respectively, according to further embodiments of the invention, where a direction forming element (42, 52 or 62 respectively) can be used to provide one or more streams of the gas mixture swirling in a tangential direction matching a predetermined internal diameter of a cylinder.

For example, in FIG. 4, an input port 47 can direct a gas mixture (such as a predefined atmospheric air) 26 to a direction forming element 42 where the air passes through nozzles 44 which are tangent to an internal counterbore, so that created gas streams are swirling along an internal diameter of the a cylinder 46. This hollow cylinder 46 can be used as a gas separation element, so that while swirling the gas mixture along an internal surface/wall of the cylinder 46, the first gas (oxygen) can substantially/essentially stay near the internal surface/wall of the cylinder 46 forming the first gas mixture (oxygen-enriched gas), and the second gas (nitrogen) can primarily enter an area 48a inside the cylinder 46 forming the second gas mixture (nitrogen-enriched gas). The collector gates can be configured using a part 43, having an opening 45 to collect the second gas mixture comprising nitrogen-enriched gas 15, and an opening 41 formed by a continuation of the wall of the cylinder 46 and a corresponding wall of the part 43 to collect the first gas mixture comprising the oxygen-enriched gas 28. The part 43 can move up and down, as shown, thus changing a size of an aperture collecting the oxygen-enriched gas 28. Therefore a portion (percentage) of oxygen in the collected gas 28 can be varied by moving the part 43 up and down in a direction 49 in response to an oxygen control signal 17 (shown in FIG. 1).

According to a further embodiment, the gas separation element may further comprise a hollow cylinder 48 symmetrically placed inside the cylinder 46, the hollow cylinder 48 having a predefined pattern of holes/openings on side walls and identifying the area 48a inside of the hollow cylinder 48. Then the second gas (nitrogen) can enter the area 48a through the predefined pattern of holes/openings to form the second gas mixture (the nitrogen-enriched gas) in the area 48a, and the first gas (oxygen) preferably stays between the surface of the internal surface/wall of the cylinder 46 and an external surface/wall of the hollow cylinder 48.

In FIG. 5, the gas/air separator 50 performs similarly to the gas/air separator 40, as discussed above. The only difference is that the direction forming element is implemented as a swirling tube 54 receiving a gas mixture (predefined atmospheric air) 26 from the input port 57 and providing a stream of the gas mixture swirling in a tangential direction matching a predetermined internal diameter of a cylinder 46. The tube 54 may have a larger capacity to intake more volume of gas/air than the nozzles 44 in FIG. 4.

In FIG. 6, the gas/air separator 60 performs similarly to gas/air separators 40 and 50. The main difference is that the direction forming element is implemented as a thread 64 with deep trenches on an external wall of one end of the cylinder 66 to create a swirling in the tangential direction matching the predetermined internal diameter of the cylinder 66 and an external diameter of a cylinder 68. It is noted that the thread 64 may be located on an external surface of the cylinder 68, on both cylinders 66 and 68.

FIGS. 7A-7B are views of further non-limiting examples of a gas/air separators 70a 70b respectively utilizing primarily flat gas separation surfaces, according to further embodiments of the invention. Surfaces shown in FIGS. 7A-7B are all flat because they correspond to the definition of flat surfaces provided above, i.e., all the surfaces are flat in any cross-section of the gas separation element comprising its central axis. The direction forming element can be used to form a predefined directional pattern of the gas mixture/predefined atmospheric air against/along one or more flat surfaces in the gas separation element, where at least one such surface may have a predefined pattern of holes/openings in order to separate at least the first enriched gas and the second enriched gas.

In FIG. 7A, the direction forming element 47 can provide the gas mixture (predefined atmospheric air) 26 impinging on surface(s) 76a of a part 43a having a predefined hole pattern and acting as a gas separator. The surface(s) 76a can be flat surfaces as defined herein, e.g., being a flat wall, a conical surface or the like (the same is applied to other surfaces of the gas/air separators 70a). The first gas (e.g., oxygen) can concentrate more near the surfaces 76a and predominantly penetrate through the predefined hole pattern on the surface(s) 76a to an area 75a, forming an oxygen-enriched gas/air. This oxygen-enriched gas/air inside the area 75a can be collected through the aperture 45. The second lighter gas (e.g., nitrogen) can be predominantly concentrated near surface(s) 71a, as explained herein, so that the nitrogen-enriched gas/air 15 can be collected through the gate(s) 73a.

The part 43a can move up and down, as shown, thus changing a configuration of the gas separation element and consequently a size of an aperture collecting the nitrogen-enriched gas 15 which can adjust a portion/percentage of nitrogen in the nitrogen-enriched gas 15 as well as a portion/percentage of oxygen in the oxygen-enriched gas in the area 75a due to changing a distance between surfaces 76a and 71a. Therefore a portion (percentage) of nitrogen in the collected gas 15 as well as a portion of oxygen in the collected gas 28 can be varied by moving the part 43a in an up and down direction 49 in response to a nitrogen control signal 21 and/or an oxygen control signal 17 (shown in FIG. 1).

In FIG. 7B, the direction forming element comprising surface(s) 78b provide the gas mixture (predefined atmospheric air) 26 impinging on surface(s) 76b (of a part 43b) having a predefined hole pattern and acting as a gas separator element. The surface(s) 76a can be defined flat surfaces as described herein, e.g., being a flat wall, a conical surface or the like (the same is applied to other surfaces of the gas/air separators 70b). The first gas (oxygen) can concentrate more near the surfaces 76a, as explained above. The second gas (nitrogen) can predominantly penetrate through the predefined hole pattern on the surface(s) 71b to an area 75b, forming the nitrogen-enriched gas/air. This nitrogen-enriched gas/air inside the area 75b can be collected through the aperture 45. The heavier gas (oxygen) 28 can be collected through the gate(s) 73b.

The part 43b can move up and down, as shown, thus changing a configuration of the gas separation element and consequently a size of an aperture collecting the oxygen-enriched gas 28 which can adjust a portion/percentage of oxygen in the oxygen-enriched gas 28, as a well as a portion/percentage of nitrogen in the nitrogen-enriched gas in the area 75b due to changing a distance between surfaces 76b and 71b. Therefore a portion/percentage of oxygen in the collected gas 28 and/or a portion (percentage) of nitrogen in the collected gas 15 can be varied by moving the part 43b in an up and down direction 49 in response to an oxygen control signal 17 and/or an nitrogen control signal (shown in FIG. 1).

Figure 8:
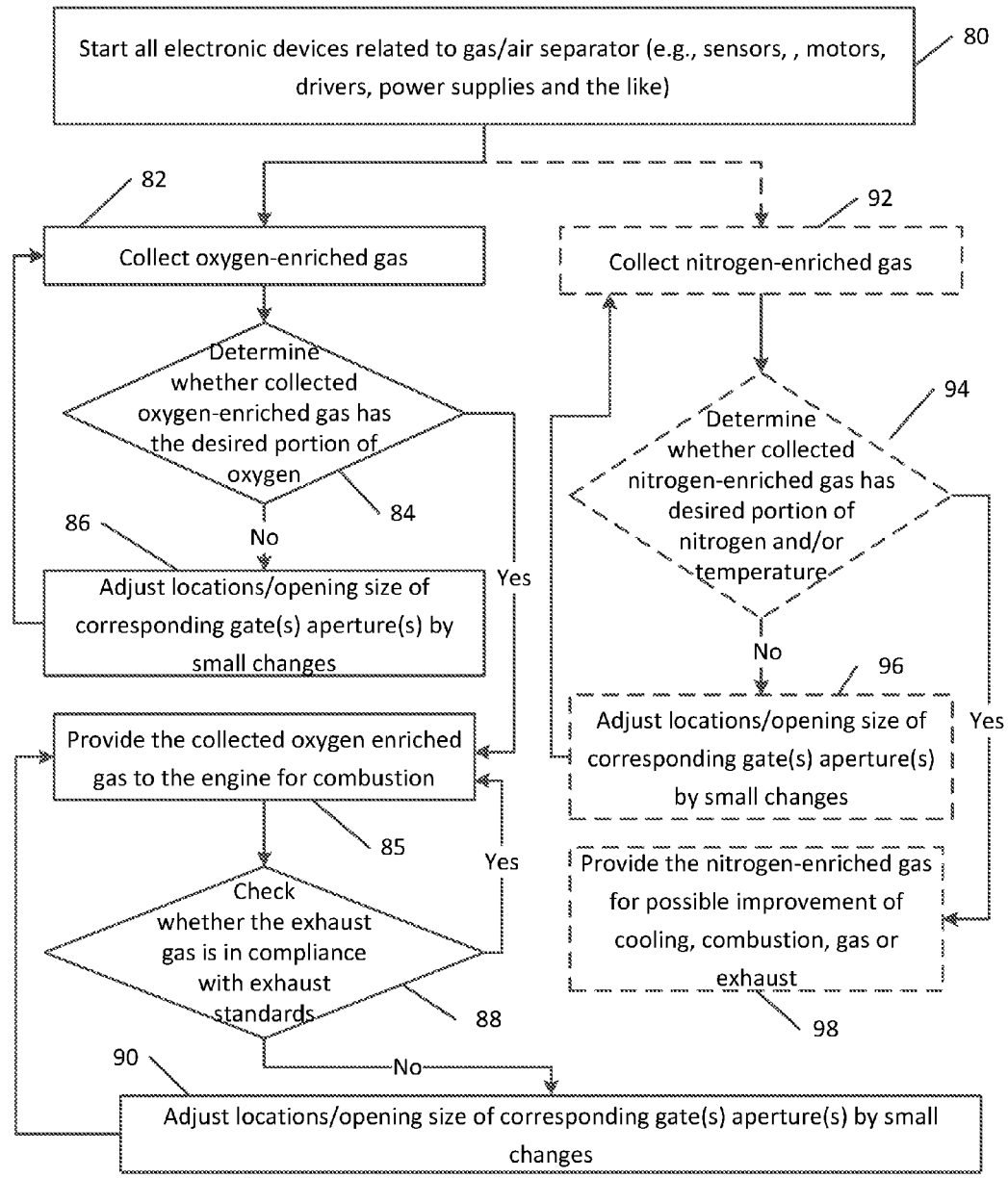
FIG. 8 is an exemplary flowchart for implementation of various embodiments of the invention.

FIG. 8 is an exemplary detailed flowchart for implementation of embodiments, which are disclosed herein. It is noted that the order of steps shown in FIG. 8 is not required, so in principle, the various steps may be performed out of the illustrated order. Also certain steps may be skipped, different steps may be added or substituted, or selected steps or groups of steps may be performed in a separate application, following the embodiments described herein.

In a method according to this exemplary embodiment, as shown in FIG. 8, in a first step 80, a computer/controller (comprising at least one processor and a memory) of an apparatus provides a start signal, e.g., to start all electronic devices related to the gas/air separator (e.g., sensors, motors, drivers, power supplies and the like). The start signal may correspond in time to turning the apparatus on, or to a moment a vehicle reaching a threshold speed.

In a next step 82, an oxygen-enriched gas is collected by the corresponding gate(s)/aperture(s), e.g., as shown in FIGS. 2-7. Then in a next step 84, it is determined whether the collected oxygen-enriched gas has the desired portion of oxygen, where the oxygen content/portion is measured by an oxygen-content sensor, as described herein, so that the readout of the measurements is provided to the computer/controller for determination. If it is determined that the collected oxygen-enriched gas does have the desired portion of oxygen, the process goes to step 85. However, if it is determined that the collected oxygen-enriched gas does not have the desired portion/content of oxygen, in a next step 86, preliminary tuning of the oxygen content in the collected oxygen-enriched gas can be provided by corresponding small shifts/adjustments of location(s)/opening size(s) of the corresponding gate(s)/aperture(s), by changing/tuning a configuration of the gas separation element, as described herein, and/or using other means, such as changing a pressure/temperature of the entered gas mixture at an input port of a gas/air separator. After the corresponding adjustments, the process can go back to step 82, and steps 82, 84 and 86 are repeated until it is determined in step 84 that the collected oxygen-enriched gas does have the desired portion of oxygen and the process then goes to step 85.

In step 85, the collected oxygen-enriched gas is provided to the engine for combustion (combustion chamber or combustion place(s)). In a next step 88, it can be determined whether the exhaust gas is in compliance with exhaust standards, where the exhaust gas parameters are measured by the exhaust sensors, as described herein, so that the readout of the measurement is provided to the computer/controller for determination. If it is determined that the exhaust gas is in compliance with the exhaust standards, the process can go to step 85 to continue a normal operation of the apparatus. However, if it is determined that the exhaust gas is not in compliance with the exhaust standards, in a next step 90, fine tuning of oxygen (and/or nitrogen) can be provided by corresponding small shifts/adjustments of location(s)/opening size(s) of the corresponding gate(s)/aperture(s), by changing/tuning a configuration of the gas separation element, as described herein, and/or using other means, such as changing a pressure/temperature of the entered gas mixture at an input port of a gas/air separator. After fine adjustments, the process can go back to step 85, and steps 85, 88 and 90 are repeated until it is determined in step 88 that the exhaust gas is in compliance with the exhaust standards and the process goes to step 85.

In step 92, a nitrogen-enriched gas can be collected by the plurality of corresponding gates/aperture openings, as described herein. In a next step 94, it can be determined whether the collected nitrogen-enriched gas has a desired portion of nitrogen and/or a desired temperature, so that this nitrogen-enriched gas can be used for a specific goal like cooling of an engine or transmission of the apparatus, providing safety of a fuel tank by filling the space left by voided fuel, or improving combustion and/or exhaust performance. If it is determined in step 94 that the collected nitrogen-enriched gas has a desired portion of nitrogen and/or a desired temperature, the process can go to step 98, where the computer/controller may determine what is an appropriate application of the nitrogen-enriched gas as described herein, so that the nitrogen-enriched gas can be provided in apparatus for possible improvement of cooling, combustion, gas or exhaust, as described herein.

If however, it is determined that the collected nitrogen-enriched gas does not have a desired portion of nitrogen and/or a desired temperature, the process can go to step 96, and fine tuning of nitrogen in the collected nitrogen-enriched gas can be provided by corresponding small shifts/adjustments of location(s)/opening size(s) of the corresponding gate(s)/aperture(s), by changing/tuning a configuration of the gas separation element, as described herein, and/or using other means, such as changing a pressure/temperature of the entered gas mixture at an input port of a gas/air separator. After corresponding adjustments, the process can go back to step 92 and steps 92, 94 and 96 are repeated until it is determined in step 94 that the collected nitrogen-enriched gas has the desired portion of nitrogen and/or the desired temperature, so that the process can proceed to step 98.

Figure 9:
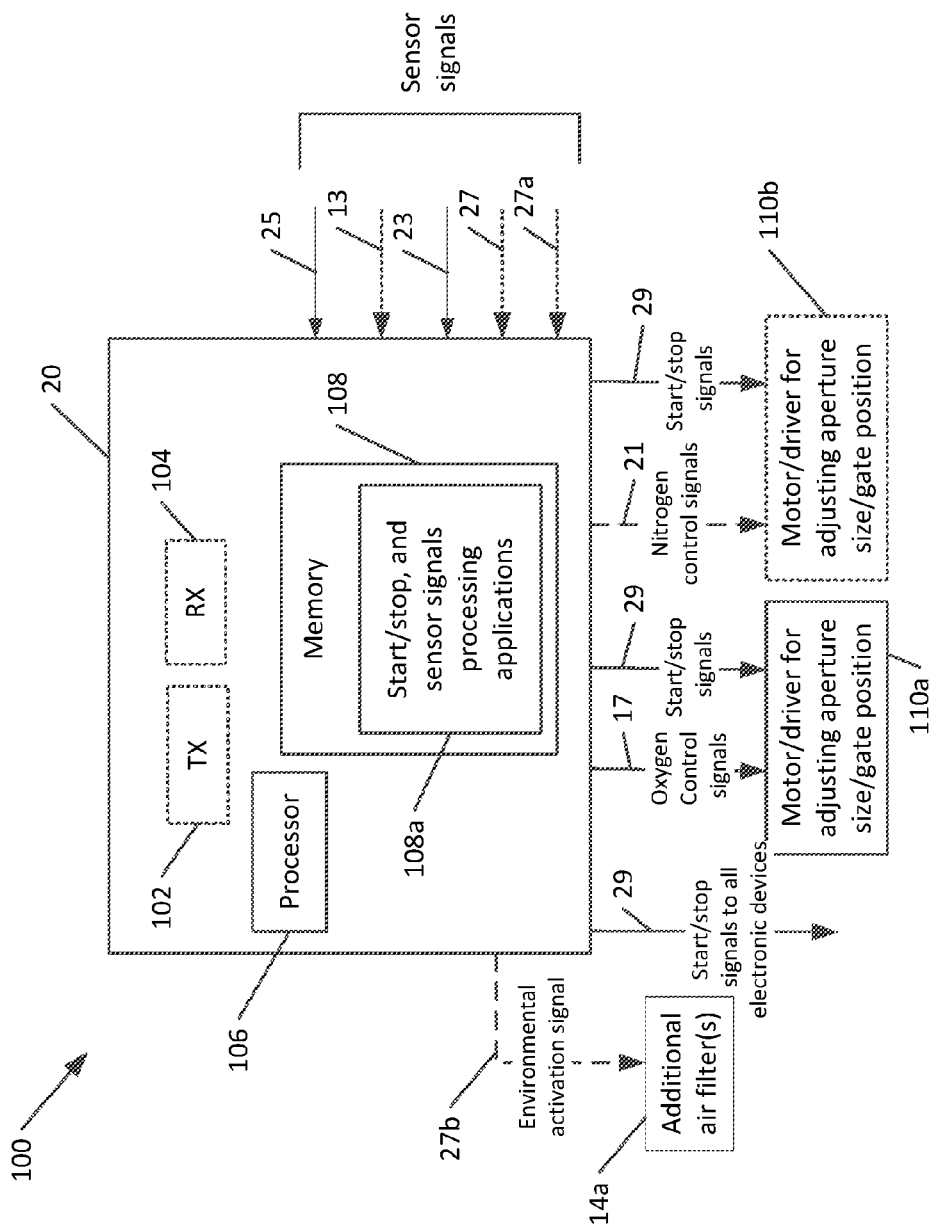
FIG. 9 is an exemplary block diagram of a computer/controller (shown in FIG. 1) demonstrating its operation within apparatus, according to various embodiments of the invention.

FIG. 9 is an exemplary block diagram 100 of a computer/controller 20 (shown in FIG. 1) demonstrating its operation within apparatus 10. FIG. 9 is a simplified block diagram of the computer/controller 20 that is suitable for practicing the exemplary embodiments of this invention, e.g., in reference to FIGS. 1-8, and a specific manner in which components of the computer/controller 20 are configured to cause the device 10 to operate.

The computer/controller 20 may comprise, e.g., at least one processor (controller) 106, and at least one memory 108 including applications 108a such as a start/stop application, a sensor signals evaluation/processing application, control signal application, and the like. The computer/controller 20 may further comprise a transmitter 102 and a receiver 104, which may be used to transmit and receive signals (wirelessly or using a wired connection). The received signals may comprise any of the signals 25, 13, 23, 27 and 27a from various sensors, as described herein in reference to FIG. 1, so the received signals are provided to corresponding applications 108a. The transmitted signals may comprise processing/command signals generated by the applications 108a, based on the received signals, for implementing various algorithms disclosed herein, such as shown in FIGS. 1-8. For example, signals 29, 17 and 21 (see FIG. 1) may be generated and directed by the corresponding applications 108a to corresponding motors/drivers, 110a and 110b for providing fine tuning of the content of oxygen and/or nitrogen in the corresponding enriched gases, as described herein, as well as other control signals such as the environmental activation signal 27b to the additional air filter 14a and the like (see FIG. 1). The transmitter 102 and the receiver 104 may be generally means for transmitting/receiving and may be implemented as a transceiver, or a structural equivalent thereof.

Various embodiments for the at least one memory 108 (e.g., computer readable memory) may include any data storage technology type which is suitable to the local technical environment, including but not limited to: semiconductor based memory devices, magnetic memory devices and systems, optical memory devices and systems, fixed memory, removable memory, disc memory, flash memory, DRAM, SRAM, EEPROM and the like. Various embodiments of the processor 106 include but are not limited to: general purpose computers, special purpose computers, microprocessors, digital signal processors (DSPs), multi-core processors, embedded, and System on Chip (SoC) devices.

The application module 108a may be implemented as one or more application computer programs stored in the memory 108, but in general it may be implemented as software, firmware and/or a hardware module, or a combination thereof. In particular, in the case of software or firmware, one embodiment may be implemented using a software related product such as a computer readable memory (e.g., non-transitory computer readable memory), computer readable medium or a computer readable storage structure comprising computer readable instructions (e.g., program instructions) using a computer program code (i.e., the software or firmware) thereon to be executed by a computer processor.

According to further embodiments of the invention, the gas/air separators, described herein, could be made from metals, plastics, ceramics, fiberglass, or other materials. For example, the casing can be molded through processes such as metal casting, plaster of Paris molding, injection molding, lost wax casting or the like. The exit tubes, metal, ceramic or organic, can be injection-molded in a variety of materials, including rubbers, non-reactive, high temperature plastic tubes, or other synthetic materials. All exit components may use coatings or be coated with nitrogen rich coatings preventing oxidative reactions.

Moreover, the continuous oxygen enriching can result in more rapid firing and higher burn efficiency. The oxygen mix can be controlled so as not to deteriorate engine components. To take full advantage of the oxygen-enriched air, certain engine components may have to be made of materials such as ceramic materials, which can withstand high temperatures.

Furthermore, in comparison to engines that use normal or compressed air, continuous oxygen air enrichers may enable engines to burn any fossil fuels at accelerated rate, on demand, in order to: produce greater power and accelerated burn rate, and produce equivalent results with less fuel. The continuous oxygen enricher can enable vehicle manufacturers and owners to: increase engine performance, even for existing vehicles; reduce future engine size and weight; increase fuel efficiency and mileage; and reduce emissions of carbon monoxide and unburned carbon.

The potential use of the novel technology described herein may include (but may not be limited to) the following:

Any motor vehicle that runs on land, water, or rails that has an engine that burns fossil fuel, benefits: increased power, fuel efficiency, and lower emissions of carbon monoxide, and particulate matter;

Aircraft, including those driven with jet engines, helicopter engines, propeller engines, turboprops, or rocket engines, benefits: increased power, fuel efficiency, and lower emissions of carbon monoxide, and particulate matter, shorter and quicker takeoffs with shorter runways, ability to fly higher;

Furnaces, including those used for building and home heating, generating power, and manufacturing, benefits: increased fuel efficiency, lower emissions of carbon monoxide, and particulate matter;

Hospitals and medical facilities: ability to continuously generate oxygen-enriched air from a central source to patient rooms, operating rooms, emergency rooms, etc.;

Respiratory treatment: portable enriched oxygen generators that replace oxygen tanks;

Scuba systems: enriched oxygen can lead to longer dive times with equipment that normally contains atmospheric air;

Fuel combustion safety: enriched oxygen can lead to the use of fuels that only burn in enriched oxygen environments; these fuels would not ignite or explode in regular atmospheric air, for instance, during automobile or plane crashes or during plane fuel leaks or service station fuel leaks;

Fire control: in order to extinguish underground mine fires, nitrogen-enriched air could be pumped into underground spaces, while collecting methane for profit; and Fuel tank safety: another possible use would be to back-fill fuel tanks during flight/ride/use with nitrogen-enriched air that will reduce tendency to burn/ignite.

Methane clearing and collection: infusion of underground spaces such as mines and sewage treatment plants with nitrogen-enriched air could flush out methane to be collected at exit points and recollect the nitrogen for reuse.

More specific benefits/advantages for using a nitrogen-enriched gas/air may include (but are not limited to) the following:

Reduced temperature and significantly reduced reactivity of the nitrogen-enriched gas compared to normal atmospheric air is due to the reduced oxygen content;

Reduced oxidization reactivity of the nitrogen-enriched gas compared to the normal atmospheric air is due to the increased nitrogen barriers interfering with oxidation;

Based on excessive energy input necessary to make nitrogen to react with any element like silicon, iron, aluminum, and titanium, it follows that nitrogen-enriched cooling gas will be significantly less reactive than atmospheric air.

Unless defined otherwise, technical and scientific terms used herein have the same meaning as is commonly understood by one having ordinary skill in the art to which this disclosure belongs. The terms "first", "second", and the like, as used herein, do not denote any order, quantity, or importance, but rather are employed to distinguish one element from another. Also, the terms "a" and "an" do not denote a limitation of quantity, but rather denote the presence of at least one of the referenced items. The use of "including," "comprising" or "having" and variations thereof herein are meant to encompass the items listed thereafter and equivalents thereof, as well as additional items. The terms "connected" and "coupled" are not restricted to physical or mechanical connections or couplings, and can include electrical and optical connections or couplings, whether direct or indirect.

Furthermore, the skilled artisan will recognize the interchangeability of various features from different embodiments. The various features described, as well as other known equivalents for each feature, can be mixed and matched by one of ordinary skill in this art, to construct additional systems and techniques in accordance with principles of this disclosure.

In describing alternate embodiments of the apparatus claimed, specific terminology is employed for the sake of clarity. The invention, however, is not intended to be limited to the specific terminology so selected. Thus, it is to be understood that each specific element includes all technical equivalents that operate in a similar manner to accomplish similar functions.

It is to be understood that the foregoing description is intended to illustrate and not to limit the scope of the invention, which is defined by the scope of the appended claims. Other embodiments are within the scope of the following claims.

It is noted that various non-limiting embodiments described and claimed herein may be used separately, combined or selectively combined for specific applications. Further, some of the various features of the above non-limiting embodiments may be used to advantage, without the corresponding use of other described features. The foregoing description should therefore be considered as merely illustrative of the principles, teachings and exemplary embodiments of this invention, and not in limitation thereof.

What is claimed is:

1. An apparatus, comprising at least one gas/air separator which comprises:
   an input port for entering a gas mixture of a plurality of gases having different molecular weights;
   a direction forming element, configured to intake the gas mixture to form a predefined directional pattern of the gas mixture;
   a gas separation element having at least one surface, so that an output gas from the direction forming element is provided at least along the at least one surface to spatially separate in part the plurality of gases, where gases with a larger molecular weight out of the different molecular weights are concentrated closer to the at least one surface;
   at least one collector gate, configured to collect a first gas mixture enriched with a first gas (a first enriched gas) near the at least one surface, the first gas having a largest molecular weight of the different molecular weights; and
   at least one further collector gate placed in a vicinity of the first collector gate but located further away from the at least one surface than the first collector, and configured to collect a second gas mixture enriched with a second gas (a second enriched gas), the second gas having a smaller molecular weight than the largest molecular weight,
      wherein the at least one gas/air separator comprises at least one tube elongated element curved in one plane with a curve sign never being a zero, where
      a first open end of the at last one tube elongated element is configured as the input port for entering the gas mixture of the plurality of gases,
      an internal wall of the a least one tube elongated element is configured to provide functionality of the direction forming element and of the gas separation element, so that the first enriched gas is collected near an internal outward curved surface of the internal wall, and the second enriched gas is collected near an internal inward curved surface of the internal wall, and
      a second end opening of the a least one tube elongated element is configured to provide the at least one collector gate and the at least one further collector gate to separately collect the first enriched gas and the second enriched gas.

2. The apparatus of claim 1, wherein the gas mixture is a predefined atmospheric air comprising gases of oxygen (O2) and nitrogen (N2), where the first enriched gas is an oxygen-enriched gas/air, the second gas mixture is a nitrogen-enriched gas/air, and the gas mixture of the plurality of gases is a predefined atmospheric air.

3. The apparatus of claim 2, wherein the apparatus comprises a fossil-fuel burning vehicle containing an automobile, a motorcycle, a truck, an aircraft, a ship, a bus or a rocket, or a fossil-fuel burning apparatus containing a power generator, a power plant, a heater or a furnace, where each of the fossil-fuel burning vehicles and apparatuses is driven by an engine comprising a combustion chamber or one or more combustion chambers/spaces and is configured to use said oxygen-enriched gas for combustion, and said nitrogen-enriched gas for one or more of: cooling of the engine or a transmission of the apparatus, for reducing explosivity of a fuel tank, and for improving combustion or exhaust performance.

4. The apparatus of claim 2, wherein the predefined atmospheric air is provided: directly from an atmosphere, or by a fan-driven device comprising an impeller, a compressor, supercharger or a turbocharger.

5. The apparatus of claim 2, further comprising an engine comprising the combustion chamber and one or more exhaust sensors analyzing a composition of an exhaust gas from the combustion chamber for providing a feedback signal for fine tuning of the oxygen-enriched gas/air entering the at least one collector gate in order to meet exhaust standards, the fine tuning is provided by one or more of: a) a corresponding small adjustment of an aperture of the at least one collector gate, b) a corresponding small adjustment of a position of the at least one collector gate, c) changing/tuning a configuration of the gas separation element, d) changing a pressure of the entered gas mixture at the input port, and e) changing a temperature of the entered gas mixture at the input port.

6. The apparatus of claim 2, further comprising a nitrogen sensor for analyzing one or both, nitrogen content and temperature, of the nitrogen-enriched gas/air, provided to facilitate tuning of one or both a desired nitrogen content and a desired temperature, which is provided by one or more of: a) a corresponding small adjustment of an aperture of the at least one further collector gate, b) a corresponding small adjustment of a position of the at least one further collector gate, c) changing/tuning a configuration of the gas separation element, d) changing a pressure of the entered gas mixture at the input port, and e) changing a temperature of the entered gas mixture at the input port.

7. The apparatus of claim 6, wherein the one or more exhaust sensors comprise one or more of: a temperature sensor, a particulate sensor, a carbon oxide sensor, a carbon dioxide sensor, an oxygen sensor, a water sensor, a carbon monoxide sensor, and a nitrogen oxide sensor.

8. The apparatus of claim 1, the predefined directional pattern comprises two different directions.

9. The apparatus of claim 1, wherein the direction forming element and the gas separation element are at least partially overlap.

10. The apparatus of claim 1, wherein a cross-section of the first open end is larger than a further cross section of the second open end.

11. The apparatus of claim 1, wherein a cross section of the at least one tube elongated element is rectangular, ellipse or circular.

12. The apparatus of claim 1, wherein the at least one tube elongated element curved in said one plane has a shape of a Fibonacci curve, a circle, an ellipse or a parabola.

13. The apparatus of claim 1, wherein a portion of the internal wall of the at least one tube elongated element comprises a predefined pattern of holes/openings for collecting the second enriched gas in an additional compartment which is configured as the at least one further collector gate for collecting the second enriched gas, so that the first enriched gas is collected through the second end opening of the original at least one tube elongated element which is configured as the at least one collector gate.

14. The apparatus of claim 1, wherein the tube elongated element shares one input port with one or more other tube elongated elements of an identical or of a substantially similar design.

15. The apparatus of claim 1, comprising a distribution gas/air pipe/rail providing/circulating said gas mixture, wherein the at least one air separator comprises a plurality of gas/air separators, so that said distribution gas/air pipe/rail comprises corresponding input ports for entering the gas mixture separately to each of the plurality of the gas/air separators.

16. The apparatus of claim 1, wherein the at least one air separator is equivalent to at least two gas/air separators, where
the direction forming element is configured to split the entered gas mixture into at least two branches, each branch having two curved outward walls at least in one plane;
the gas separation element comprises curved portions of the at least two branches corresponding to the at least two gas/air separators, where an internal curved outward wall of the two curved outward walls in each branch is partially removed, so that the second gas enters an area between the at least two branches to form the second gas mixture comprising the second enriched gas;
the at least one collector gate comprises two collector gates corresponding to the at least two gas/air separators and configured to collect the first gas mixture comprising the first enriched gas from ends of the at least two branches respectively, where the at least one surface is an external curved outward wall of the two curved outward walls in each branch; and
the at least one further collector gate corresponding to the at least two gas/air separators and configured to collect the second gas mixture comprising the second enriched gas from the area between the at least two branches.

17. The apparatus of claim 16, wherein the internal curved outward wall of the two curved outward walls in each branch is partially removed by using a predefined pattern of holes/openings in the internal curved outward wall for more efficient gas separation, so that the second gas substantially enters the area between the at least two branches through the predefined pattern of holes/openings to form the second gas mixture comprising the second enriched gas.

18. A method, comprising:
entering a gas mixture of a plurality of gases having different molecular weights at an input port of at least one gas/air separator;
forming a predefined directional pattern of the gas mixture by a direction forming element of the at least one gas/air separator;
providing an output from the direction forming element at least along a surface of a gas separation element of the at least one gas/air separator to spatially separate in part the plurality of gases, where gases with a larger molecular weight out of the different molecular weights are concentrated closer to the at least one surface;
collecting, using at least one collector gate of the at least one gas/air separator, a first gas mixture enriched with a first gas (a first enriched gas) near said surface, the first gas having a largest molecular weight of the different molecular weights; and
collecting using at least one further collector gate of the at least one gas/air separator placed in a vicinity of the at least one first collector gate but located further away from said surface than the at least one first collector, and configured to collect a second gas mixture enriched with a second gas (a second enriched gas), the second gas having a smaller molecular weight than the largest molecular weight,
wherein the at least one gas/air separator comprises a tube elongated element curved in one plane with a curve sign never being a zero, where
a first open end of the tube elongated element is configured as the input port for entering the gas mixture of the plurality of gases,
an internal wall of the tube elongated element is configured to provide functionality of the direction forming element and of the gas separation element, so that the first enriched gas is collected near an internal outward curved surface of the internal wall, and the second enriched gas is collected near an internal inward curved surface of the internal wall, and
a second end opening of the tube elongated element is configured to provide the at least one collector gate and the at least one further collector gate to separately collect the first enriched gas and the second enriched gas.

19. The method of claim 18, wherein the gas mixture is a predefined atmospheric air comprising gases of oxygen ($O_2$) and nitrogen ($N_2$), where the first enriched gas is an oxygen-enriched gas/air, the second gas mixture is a nitrogen-enriched gas/air, and the gas mixture of the plurality of gases is a predefined atmospheric air.

20. The method of claim 19, further comprising:
providing the collected oxygen-enriched gas/air to a combustion chamber of an apparatus;
determining whether the exhaust gas of the combustion process is in compliance with exhaust standards, using a plurality of one or more exhaust sensors analyzing a composition of the exhaust gas; and
providing a feedback signal for fine tuning of the oxygen enriched gas/air entering the at least one collector gate in order to meet the exhaust standards, the fine tuning is provided by one or more of: a) a corresponding small adjustment of an aperture of the at least one collector gate, b) a corresponding small adjustment of a position of the at least one collector gate, c) changing/tuning a configuration of the gas separation element, d) changing a pressure of the entered gas mixture at the input port, and e) changing a temperature of the entered gas mixture at the input port.

21. The method of claim 19, before providing the collected oxygen-enriched gas/air to a combustion chamber of the apparatus for a combustion process, further comprising:
determining whether the collected oxygen-enriched gas/air has a desired portion of oxygen, using at least one oxygen-content gas sensor; and
providing a feedback signal for preliminary tuning at least for the desired portion of oxygen in the oxygen-enriched gas/air, the preliminary tuning is provided by one or more of: a) a corresponding small adjustment of an aperture of the at least one collector gate, b) a corresponding small adjustment of a position of the at least one collector gate, c) changing/tuning a configuration of the gas separation element, d) changing a pressure of the entered gas mixture at the input port, and e) changing a temperature of the entered gas mixture at the input port.

22. The method of claim 19, further comprising:

using the collected nitrogen-enriched gas/air in the apparatus for one or more of: cooling of an engine of the apparatus, for reducing explosivity of a fuel tank, and for improving combustion or exhaust performance.

23. The method of claim 19, further comprising:

determining whether the collected nitrogen-enriched gas/air has a desired portion of nitrogen, using at least one nitrogen-content gas sensor; and providing a feedback signal for tuning of the desired portion of nitrogen in the nitrogen-enriched gas/air, the tuning is provided by one or more of: a) a corresponding small adjustment of an aperture of the at least one further collector gate, b) a corresponding small adjustment of a position of the at least one further collector gate, c) changing/tuning a configuration of the gas separation element, d) changing a pressure of the entered gas mixture at the input port, and e) changing a temperature of the entered gas mixture at the input port.

\* \* \* \* \*